*(12)* United States Patent
Lee et al.

(10) Patent No.: US 11,323,233 B2
(45) Date of Patent: May 3, 2022

(54) METHOD FOR TRANSMITTING SIGNAL BY TERMINAL IN WIRELESS COMMUNICATION SYSTEM, AND DEVICE USING METHOD

(71) Applicant: LG ELECTRONICS INC., Seoul (KR)

(72) Inventors: Jongyoul Lee, Seoul (KR); Youngtae Kim, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 16/963,999

(22) PCT Filed: Jan. 31, 2019

(86) PCT No.: PCT/KR2019/001377
§ 371 (c)(1),
(2) Date: Jul. 22, 2020

(87) PCT Pub. No.: WO2019/151803
PCT Pub. Date: Aug. 8, 2019

(65) Prior Publication Data
US 2021/0036834 A1 Feb. 4, 2021

Related U.S. Application Data

(60) Provisional application No. 62/624,755, filed on Jan. 31, 2018.

(51) Int. Cl.
*H04L 5/00* (2006.01)
*H04W 4/40* (2018.01)
(Continued)

(52) U.S. Cl.
CPC ......... *H04L 5/0094* (2013.01); *H04L 5/0051* (2013.01); *H04L 5/0082* (2013.01);
(Continued)

(58) Field of Classification Search
CPC ..................................................... H04L 5/0094
See application file for complete search history.

(56) References Cited

U.S. PATENT DOCUMENTS

2019/0222357 A1\* 7/2019 Huang .................. H04L 1/1614
2020/0336249 A1\* 10/2020 Yi ......................... H04L 5/0094

FOREIGN PATENT DOCUMENTS

| WO | 2017/171523 | 10/2017 |
| WO | 2017/176096 | 10/2017 |
| WO | 2017/222351 | 12/2017 |

OTHER PUBLICATIONS

PCT International Application No. PCT/KR2019/001377, International Search Report dated May 3, 2019, 2 pages.
(Continued)

*Primary Examiner* — Hoon J Chung
(74) *Attorney, Agent, or Firm* — Lee, Hong, Degerman, Kang & Waimey PC

(57) ABSTRACT

Provided are a method for transmitting a signal by a terminal in a wireless communication system, and a terminal using the method. The method comprises: selecting a method for transmitting from a first symbol and a last symbol among a plurality of symbols included in a transmission time interval; and transmitting a signal from the first symbol and the last symbol by using the selected transmission method, wherein the selected transmission method is a first transmission method or a second transmission method, the first transmission method being a transmission method for transmitting the signal by using a symbol determined for a first subcarrier spacing in time domain and subcarriers spaced a certain distance apart from each other in frequency domain, and the
(Continued)

(a)

(b)

second transmission method being a transmission method for transmitting the signal by using a symbol determined for a second subcarrier spacing in time domain and consecutive subcarriers in frequency domain.

15 Claims, 41 Drawing Sheets

(51) Int. Cl.
  *H04W 72/04* (2009.01)
  *H04W 92/18* (2009.01)
(52) U.S. Cl.
  CPC ......... *H04W 4/40* (2018.02); *H04W 72/0406* (2013.01); *H04W 72/0453* (2013.01); *H04W 92/18* (2013.01)

(56) References Cited

OTHER PUBLICATIONS

ITRI, "Enhancement to physical layer structure in high speed scenarios for new radio," 3GPP TSG RAN WG1 Meeting #88, R1-1702391, Feb. 13-17, 2017, 10 pages.
Huawei et al., "DMRS design for URLLC," 3GPP TSG RAN WG1 Meeting #90bis, R1-1718250, Oct. 9-13, 2017, 7 pages.

* cited by examiner

METHOD FOR TRANSMITTING SIGNAL BY TERMINAL IN WIRELESS COMMUNICATION SYSTEM, AND DEVICE USING METHOD

CROSS-REFERENCE TO RELATED APPLICATIONS

This application is the National Stage filing under 35 U.S.C. 371 of International Application No. PCT/KR2019/001377, filed on Jan. 31, 2019, which claims the benefit of U.S. Provisional Application No. 62/624,755, filed on Jan. 31, 2018, the contents of which are all hereby incorporated by reference herein in their entirety.

BACKGROUND OF THE DISCLOSURE

Field of the Disclosure

The present disclosure relates to wireless communication, and more particularly, to a signal transmission method of a terminal in a wireless communication system, and a communication device using the method.

Related Art

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication.

A new communication system design is under consideration, which takes into account services or terminals sensitive to reliability and latency; the next-generation radio access technology which supports enhanced mobile broadband communication, massive MTC, Ultra-Reliable and Low Latency Communication (URLLC), and so on may be referred to as a new RAT or new radio (NR).

Meanwhile, vehicle-to-everything (V2X) communication may also be supported in the NR. The V2X communication means communication between a user equipment (UE) installed in a vehicle and any UE, for example, a UE installed in another vehicle, a UE of a pedestrian, and/or a UE as infrastructure.

Meanwhile, a plurality of subcarrier spacings are defined in the NR. For example, not only a subcarrier spacing of 15 kHz but also a plurality of subcarrier spacings such as 15 kHz×$2^n$ (where n is a natural number) may be defined. A time length of one TTI may be defined differently depending on each subcarrier spacing. In the NR, UEs may use different TTIs.

In such an NR environment, there is a need for a signal transmission method in which each UE can effectively use a resource while reducing unnecessary interference to another UE as much as possible. In addition, there is also a need for a method of transmitting a demodulation reference signal (DM RS) suitable for V2X communication by considering that the V2X communication may be used in the NR environment and that the V2X communication requires a more stable and highly reliable data demodulation method since it is vehicle-related communication.

SUMMARY OF THE DISCLOSURE

The present disclosure provides a signal transmission method of a terminal in a wireless communication system, and a device using the method.

In one aspect, provided is a signal transmission method of a terminal in a wireless communication system. The method includes selecting a transmission scheme in a first symbol and a last symbol among a plurality of symbols comprised in a transmission time interval (TTI) and transmitting the signal in the first symbol and the last symbol by using the selected transmission scheme. The selected transmission scheme is a first transmission scheme or a second transmission scheme. Here, the first transmission scheme is a transmission scheme in which the signal is transmitted by using one symbol determined for a first subcarrier spacing in a time domain and subcarriers spaced apart with a specific interval in a frequency domain, and the second transmission scheme is a transmission scheme in which the signal is transmitted by using one symbol determined for a second subcarrier spacing in the time domain and subcarriers consecutive in the frequency domain.

A length in a time domain of the first symbol and last symbol may be a time length determined for a case where a subcarrier spacing is 15 kHz.

The second subcarrier spacing may be n times (where n is a natural number greater than or equal to 2) the first subcarrier spacing.

A length in a time domain of one symbol determined for the second subcarrier spacing may be 1/n times a length in a time domain of one symbol determined for the first subcarrier spacing.

The first transmission scheme may be a transmission scheme in which the signal is transmitted by using even-numbered subcarriers or odd-numbered subcarriers in the frequency domain.

The signal may be data or a demodulation reference signal (DM RS).

The first subcarrier spacing may be 15 kHz.

The terminal may transmit a DM RS for vehicle-to-everything (V2X) communication by using specific resources, wherein the specific resources comprise a resource in the first symbol.

In another aspect, provided is a terminal. The terminal includes a transceiver transmitting and receiving a radio signal and a processor operatively coupled with the transceiver. The processor is configured to: select a transmission scheme in a first symbol and a last symbol among a plurality of symbols comprised in a transmission time interval (TTI) and transmit the signal in the first symbol and the last symbol by using the selected transmission scheme. The selected transmission scheme is a first transmission scheme or a second transmission scheme. Here, the first transmission scheme is a transmission scheme in which the signal is transmitted by using one symbol determined for a first subcarrier spacing in a time domain and subcarriers spaced apart with a specific interval in a frequency domain, and the second transmission scheme is a transmission scheme in which the signal is transmitted by using one symbol determined for a second subcarrier spacing in the time domain and subcarriers consecutive in the frequency domain.

In NR in which each terminal can perform communication according to different numerologies, interference between terminals can be reduced, and resources can be efficiently used when signals are transmitted and received. In addition, the present disclosure is applicable to V2X communication. In this case, there is also provided a demodulation reference signal transmission method capable of increasing efficiency of resource usage while increasing data demodulation reliability in V2X communication.

DESCRIPTION OF EXEMPLARY EMBODIMENTS

Figure 1:
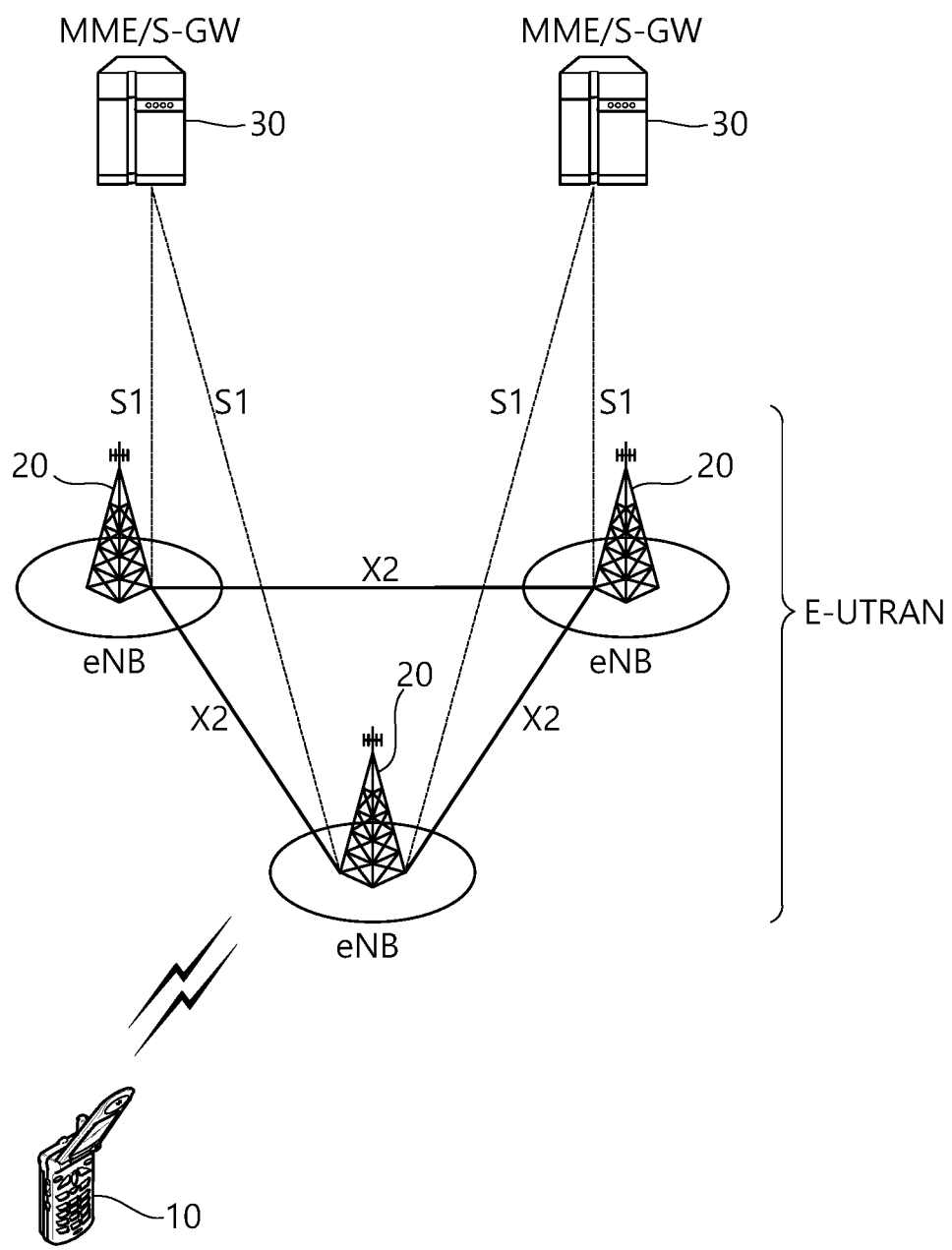
FIG. 1 shows a wireless communication system.

FIG. 1 shows a wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
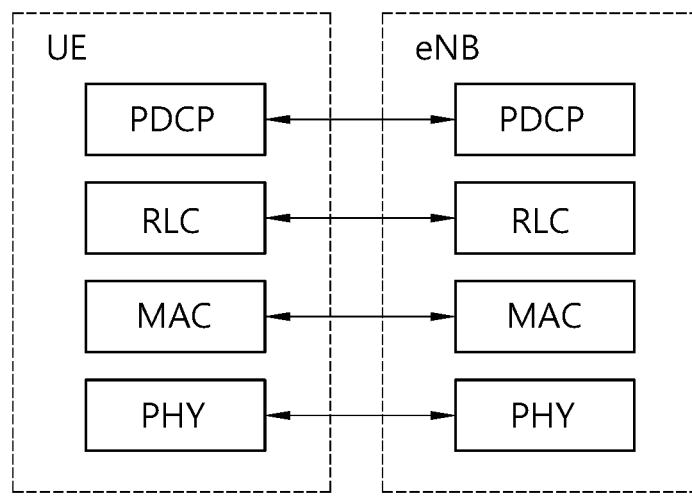
FIG. 2 is a diagram showing a wireless protocol architecture for a user plane.
Figure 3:
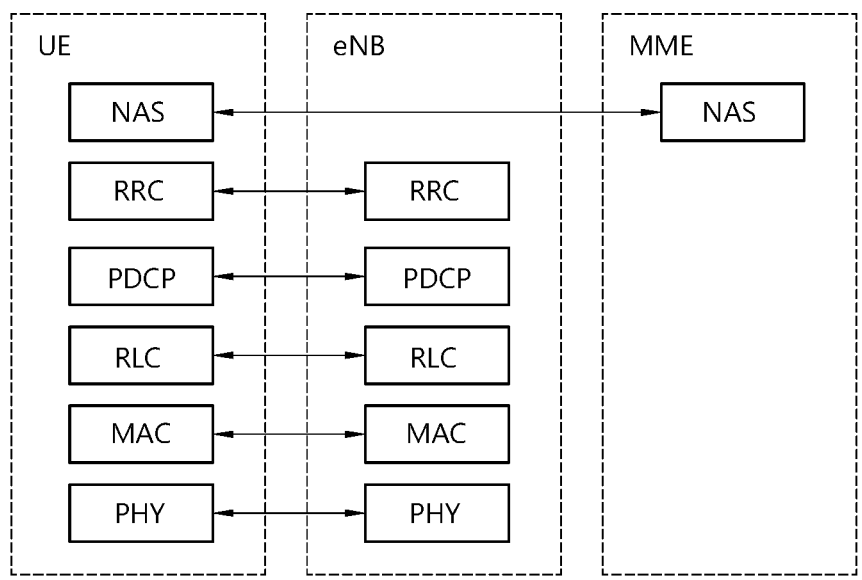
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

In what follows, a new radio access technology (RAT) will be described. The new radio access technology may also be called a new radio (NR) for short.

As more and more communication devices require a larger communication capacity, needs for improved mobile broadband communication over conventional radio access technologies (RATs) are emerging. Also, massive Machine Type Communication (MTC) which connects a plurality of devices and objects to each other and provides various services anytime and anywhere is also one of important issues that need to be considered in the next-generation communication. In addition, a new communication system design is under consideration, which takes into account services or terminals sensitive to reliability and latency; adoption of the next-generation radio access technology which supports enhanced mobile broadband communication, massive MTC, Ultra-Reliable and Low Latency Communication (URLLC), and so on is under consideration, which, for the purpose of convenience, is referred to as a new RAT or new radio (NR) in the present disclosure.

Figure 4:
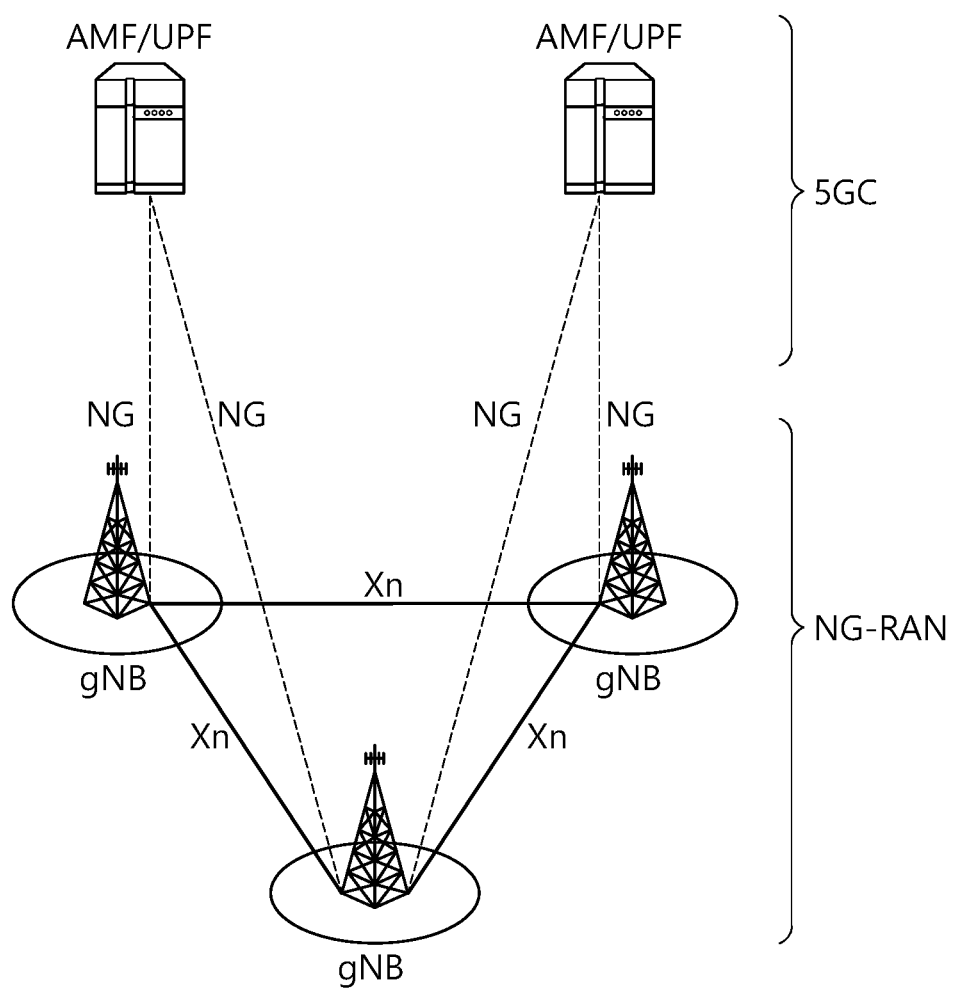
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, NG-RAN may include a gNB and/or eNB which provides a UE with the user plane and control plane protocol termination. FIG. 4 illustrates the case where only the gNB is included. The gNB and the eNB are connected to each other through the Xn interface. The gNB and the eNB are connected to the 5G core network (5GC) through the NG interface. More specifically, the gNB and the eNB are connected to the access and mobility management function (AMF) through the NG-C interface and to the user plane function (UPF) through the NG-U interface.

Figure 5:
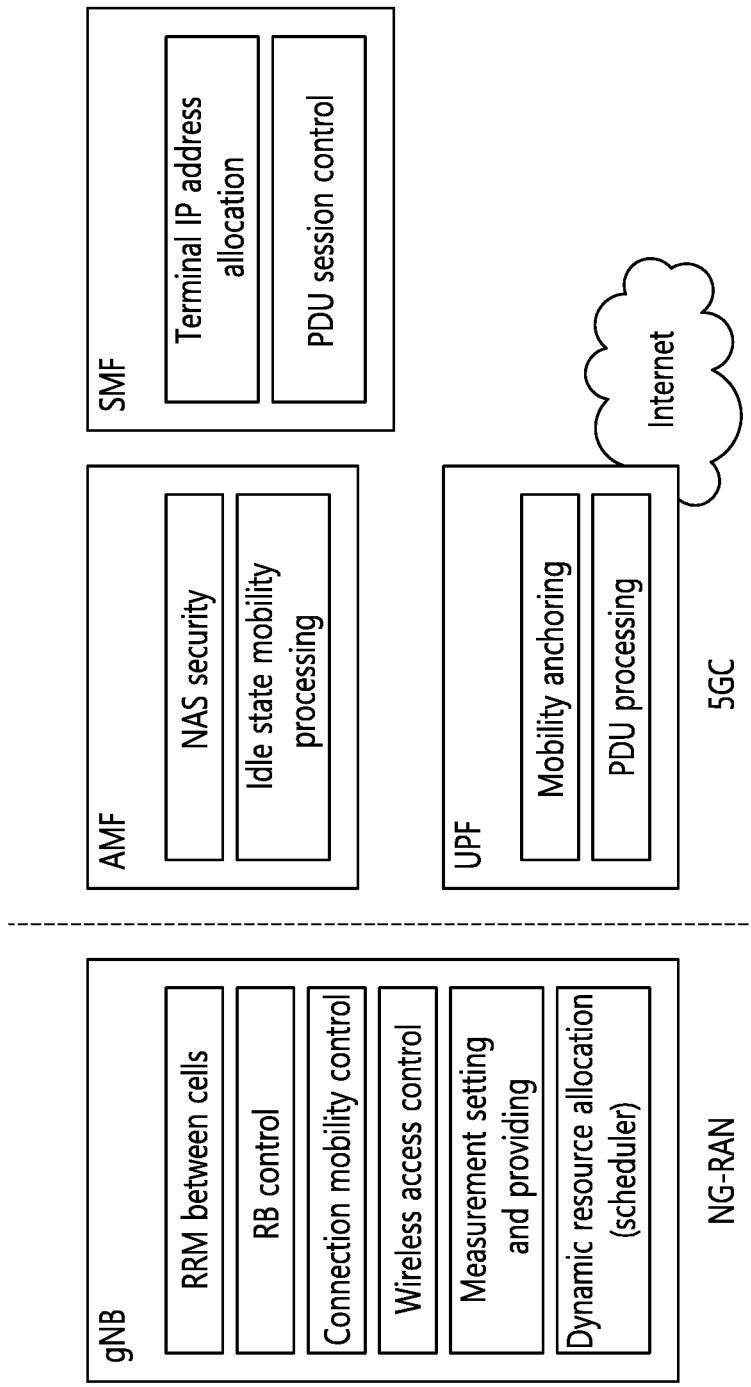
FIG. 5 illustrates a functional division between the NG-RAN and the 5GC.

FIG. 5 illustrates a functional division between the NG-RAN and the 5GC.

Referring to FIG. 5, the gNB may provide functions such as inter-cell radio resource management (RRM), radio bearer (RB) management, connection mobility control, radio admission control, measurement configuration & provision, and dynamic resource allocation. The AMF may provide such functions as NAS security and idle state mobility processing. The UPF may provide such functions as mobility anchoring and PDU processing. The Session Management Function (SMF) may provide functions such as allocation of UE IP address and PDU session control.

Figure 6:
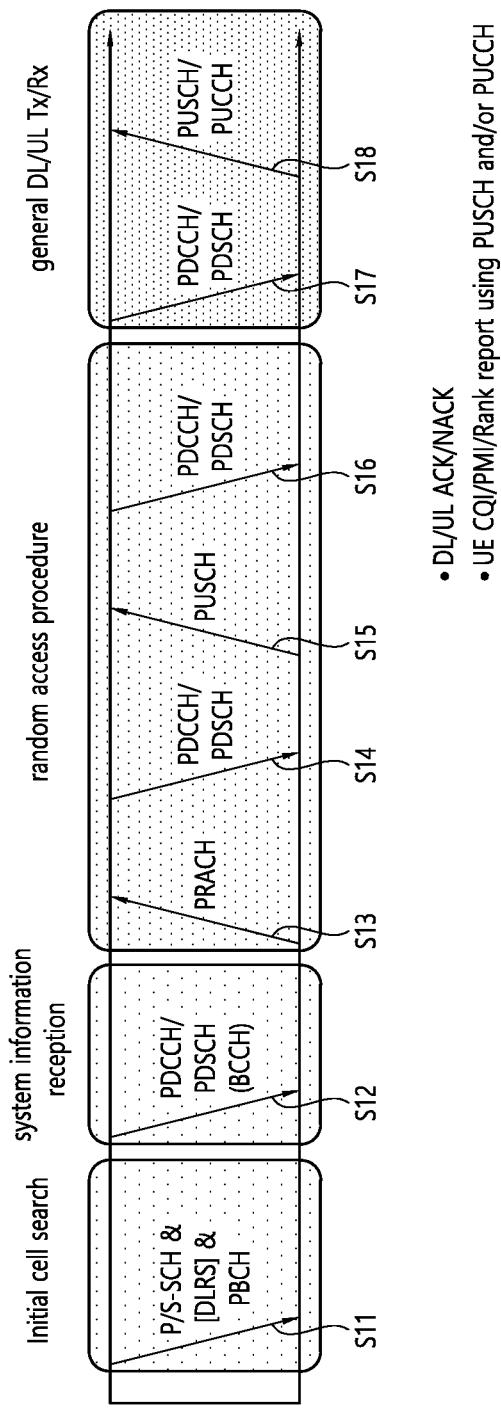
FIG. 6 illustrates a process of transmitting typical signals and physical channels used in a wireless communication system.

FIG. 6 illustrates a process of transmitting typical signals and physical channels used in a wireless communication system.

In a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13~S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS may be referred to as uplink control information (UCI). The UCI may include hybrid automatic repeat and request (HARQ) acknowledgement (ACK)/negative-ACK (NACK), scheduling request (SR), channel state information (CSI), or the like. The CSI may include a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

Meanwhile, a new RAT system such as NR may use an OFDM transmission scheme or a transmission scheme similar thereto. The new RAT system may follow OFDM parameters different from OFDM parameters of LTE. Alternatively, the new RAT system directly follows a legacy LTE/LTE-A numerology, but may have a wider system bandwidth (e.g., 100 MHz). Alternatively, one cell may support a plurality of numerologies. That is, UEs operating with different numerologies may co-exist within one cell.

Figure 7:
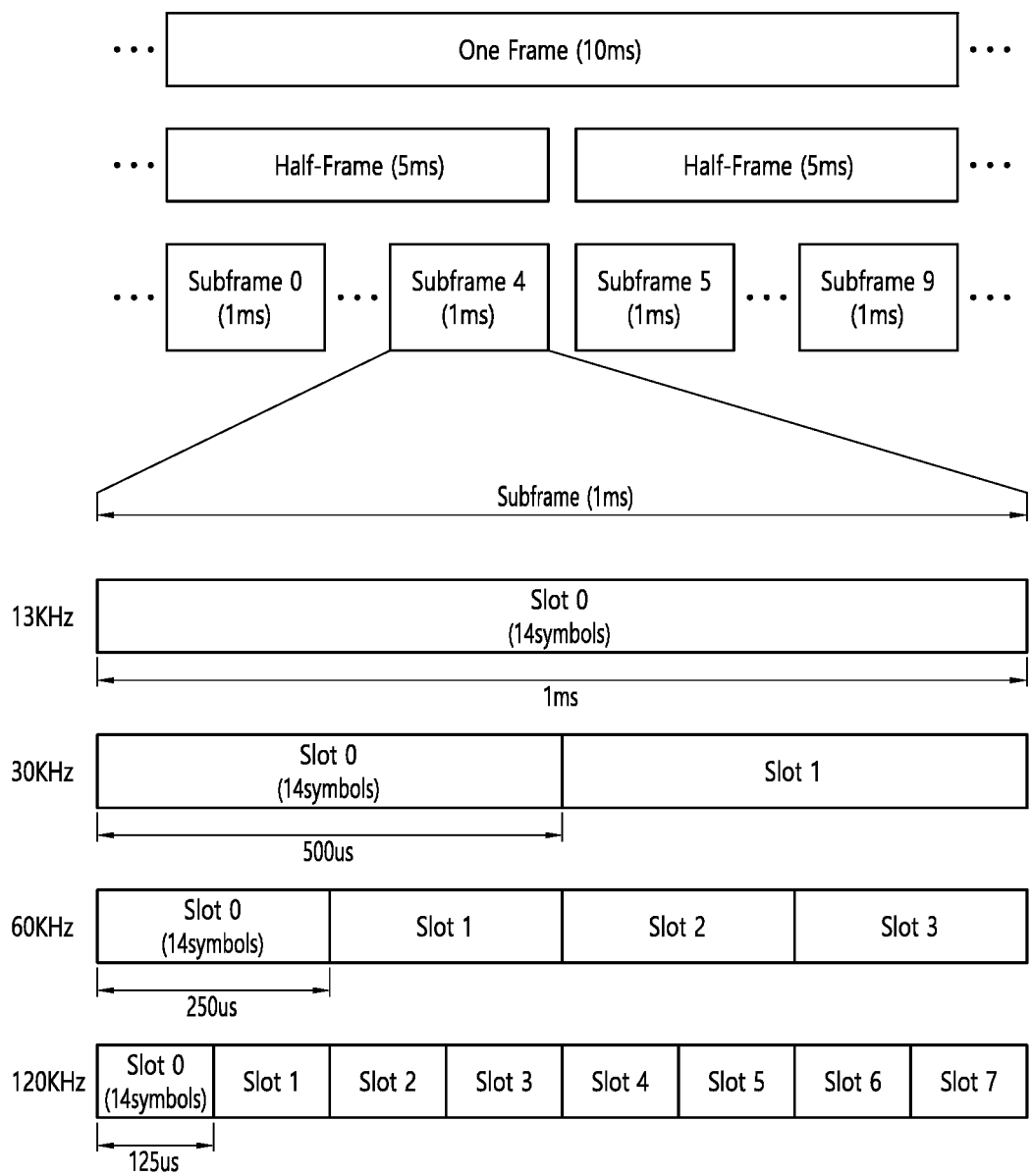
FIG. 7 illustrates a radio frame structure used in NR.

FIG. 7 illustrates a radio frame structure used in NR.

In the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration ($\mu$), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 8:
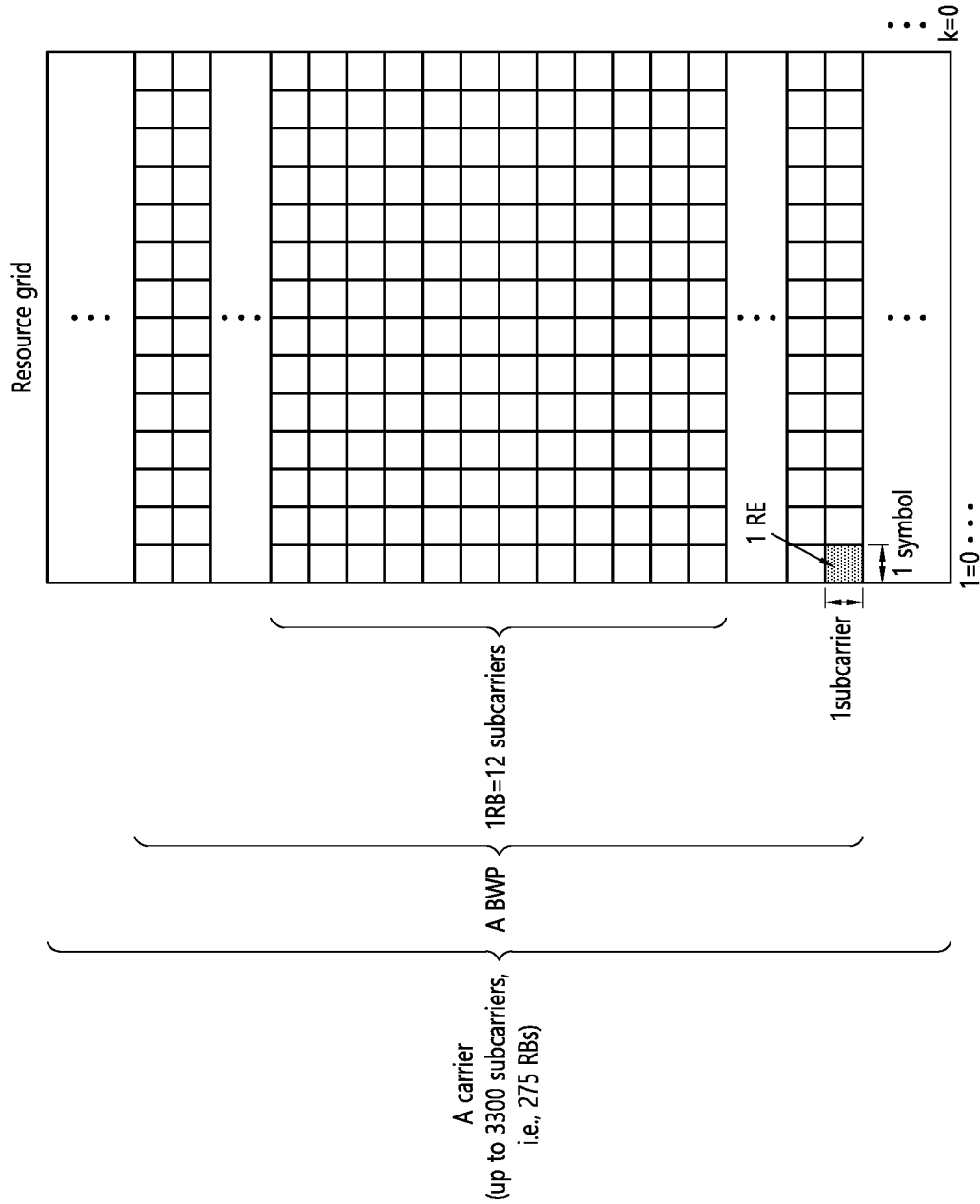
FIG. 8 illustrates a slot structure of an NR frame.

FIG. 8 illustrates a slot structure of an NR frame.

A slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Figure 9:
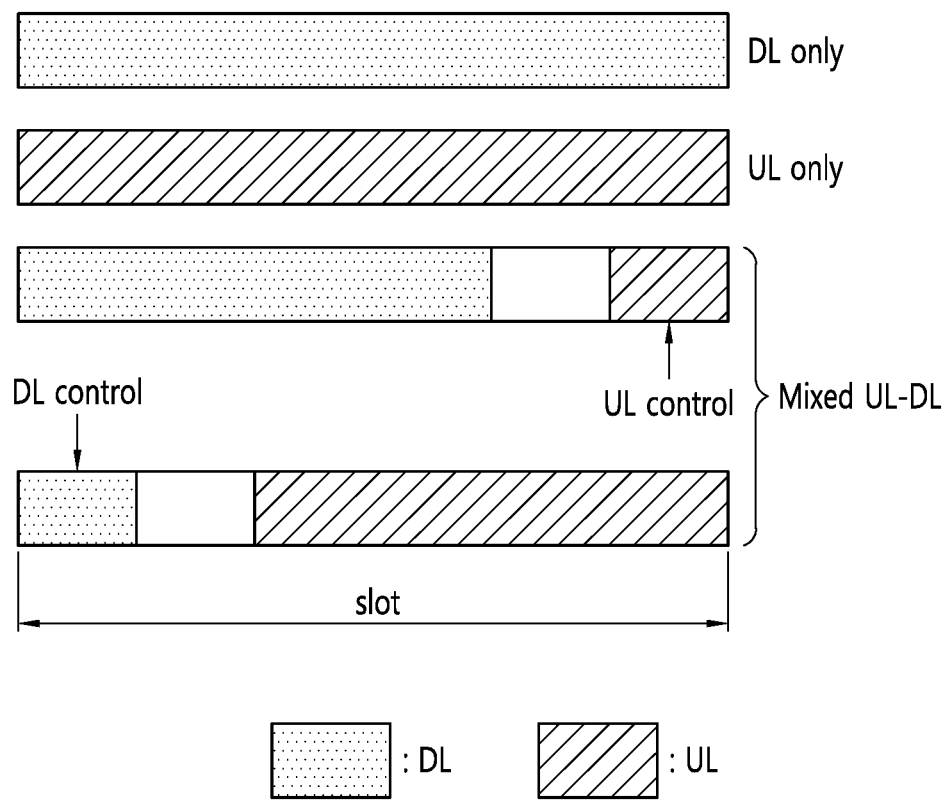
FIG. 9 illustrates a structure of a self-contained slot.

FIG. 9 illustrates a structure of a self-contained slot.

In an NR system, a DL control channel, DL or UL data, a UL control channel, and the like may be contained in one slot. For example, first N symbols (hereinafter, DL control region) in the slot may be used to transmit a DL control channel, and last M symbols (hereinafter, UL control region) in the slot may be used to transmit a UL control channel. N and M are integers greater than or equal to 0. A resource region (hereinafter, a data region) which exists between the DL control region and the UL control region may be used for DL data transmission or UL data transmission.

For example, one slot may have any one of the following configurations.

Respective durations are listed in a temporal order.
1. DL only configuration
2. UL only configuration
3. Mixed UL-DL configuration
   DL region+Guard period (GP)+UL control region
   DL control region+GP+UL region Herein, the DL region may be: (i) DL data region or (ii) DL control region+DL data region, and the UL region may be: (i) UL data region, (ii) UL data region+UL control region A PDCCH may be transmitted in the DL control region, and a physical downlink shared channel (PDSCH) may be transmitted in the DL data region. A physical uplink control channel (PUCCH) may be transmitted in the UL control region, and a physical uplink shared channel (PUSCH) may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. A GP provides a time gap in a process in which a BS and a UE switch from a TX mode to an RX mode or a process in which the BS and the UE switch from the RX mode to the TX mode. Some symbols at the time of switching from DL to UL within a subframe may be configured as the GP.

Meanwhile, the present disclosure may also be applied to V2X communication. The present disclosure is described with respect to the V2X communication of the NR but may also be applied to other scenarios including V2V or device-to-device (D2D) communication.

Figure 10:
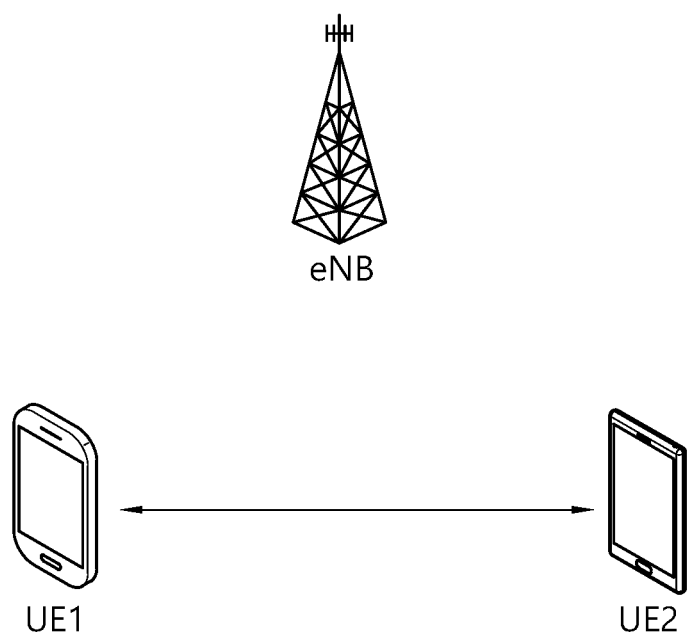
FIG. 10 illustrates UEs performing V2X or D2D communication.

FIG. 10 illustrates UEs performing V2X or D2D communication.

Referring to FIG. 10, in the V2X/D2D communication, the term UE primarily refers to a user terminal. However, when a network device such as an eNB transmits and receives a signal according to a communication scheme employed for UEs, the eNB may also be regarded as a kind of terminal.

UE 1 may operate to select a resource unit corresponding to a specific resource within a resource pool which is a set of series of resources and to transmit a D2D signal by using the corresponding resource unit. UE 2, which is a UE receiving the D2D signal, may be configured for a resource pool to which the UE 1 may transmit a signal and detect the signal transmitted from the UE 1 within the corresponding resource pool.

At this time, if the UE 1 is within coverage of an eNB, the eNB may inform the UE 1 of the resource pool. On the other hand, if the UE 1 lies outside the coverage of the eNB, other UE may inform the UE 1 of the resource pool, or a predetermined resource may be utilized.

In general, a resource pool consists of a plurality of resource units, and each UE may select one or more resource units to transmit its D2D signal.

Figure 11:
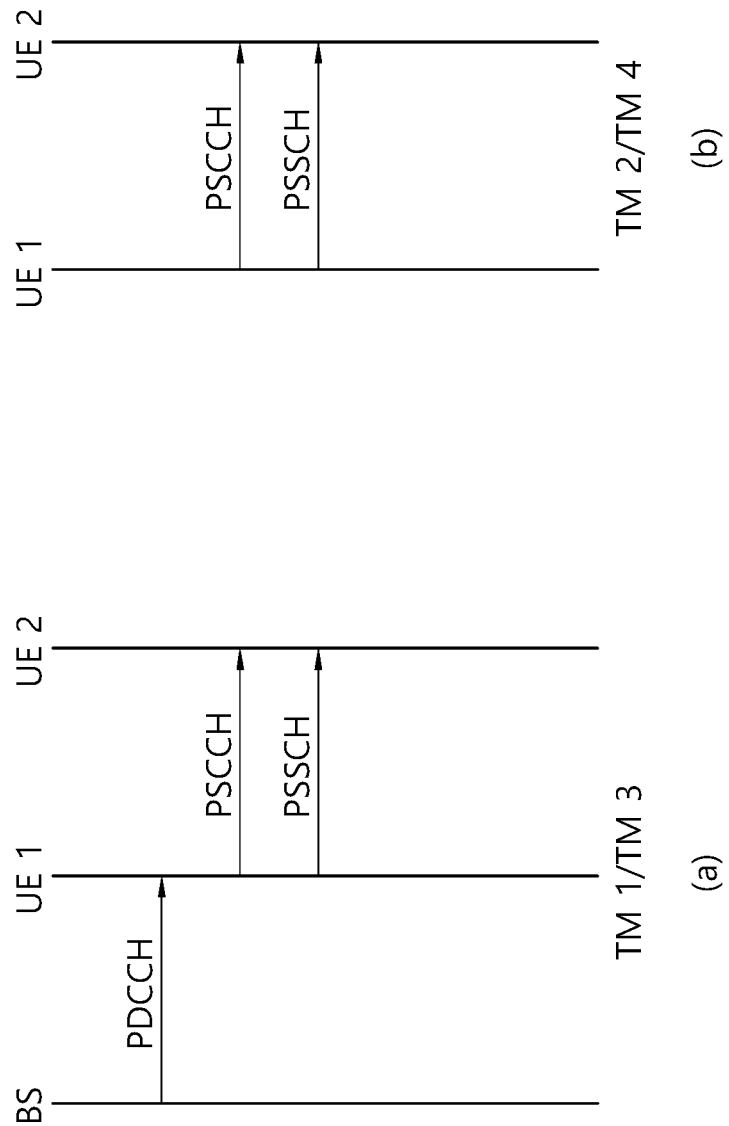
FIG. 11 illustrates a UE operation according to the transmission mode (TM) related to V2X/D2D communication.

FIG. 11 illustrates a UE operation according to the transmission mode (TM) related to V2X/D2D communication.

FIG. 11(a) is related to transmission mode 1, 3 while FIG. 11(b) is related to transmission mode 2, 4. In the transmission mode 1, 3, an eNB performs resource scheduling for UE 1 through PDCCH (more specifically, DCI), and the UE 1 performs D2D/V2X communication with UE 2 according to the corresponding resource scheduling. After transmitting Sidelink Control Information (SCI) to the UE 2 through a Physical Sidelink Control Channel (PSCCH), the UE 1 may transmit data based on the SCI through a Physical Sidelink Shared Channel (PSSCH). The transmission mode 1 may be applied to D2D communication while the transmission mode 3 may be applied to V2X communication.

The transmission mode 2, 4 may be referred to as a mode in which a UE performs scheduling autonomously. More specifically, the transmission mode 2 may be applied to D2D communication, and a UE may select a resource by itself within a set resource pool to perform a D2D operation. The transmission mode 4 may be applied to V2X communication, and a UE may select a resource by itself within a selection window through a process such as sensing/SA decoding, after which the UE may perform a V2X operation. After transmitting SCI to the UE 2 through the PSCCH, the UE 1 may transmit data based on the SCI through the PSSCH. In what follows, the transmission mode may be referred to as a mode.

While the control information transmitted by an eNB to a UE through the PDCCH is called downlink control information (DCI), the control information transmitted by a UE to other UEs through the PSCCH may be called SCI. The SCI may be expressed in various formats, for example, SCI format 0 and SCI format 1.

The SCI format 0 may be used for scheduling of the PSSCH. The SCI format 0 may include a frequency hopping flag (1 bit), resource block allocation and hopping resource allocation field (the number of bits of which may differ depending on the number of resource blocks of a sidelink), time resource pattern (7 bit), modulation and coding scheme (MCS) (5 bit), time advance indication (11 bit), and group destination ID (8 bit).

The SCI format 1 may be used for scheduling of the PSSCH. The SCI format 1 may include priority (3 bit), resource reservation (4 bit), frequency resource position of initial transmission and retransmission (the number of bits of which may differ depending on the number of sub-channels of a sidelink), time gap between initial transmission and retransmission (4 bit), MCS (5 bit), retransmission index (1 bit), and reserved information bit. In what follows, the reserved information bit may be called a reserved bit for short. Reserved bits may be added until the bit size of the SCI format 1 becomes 32 bit. In other words, the SCI format 1 includes a plurality of fields, each of which has different information from each other, where the number of remaining bits excluding the total number of bits of the plurality of fields from the total number of fixed bits (32 bit) of the SCI format 1 may be called reserved bits.

e SCI format 0 may be used for the transmission mode 1, 2 while the SCI format 1 may be used for the transmission mode 3, 4.

Figure 12:
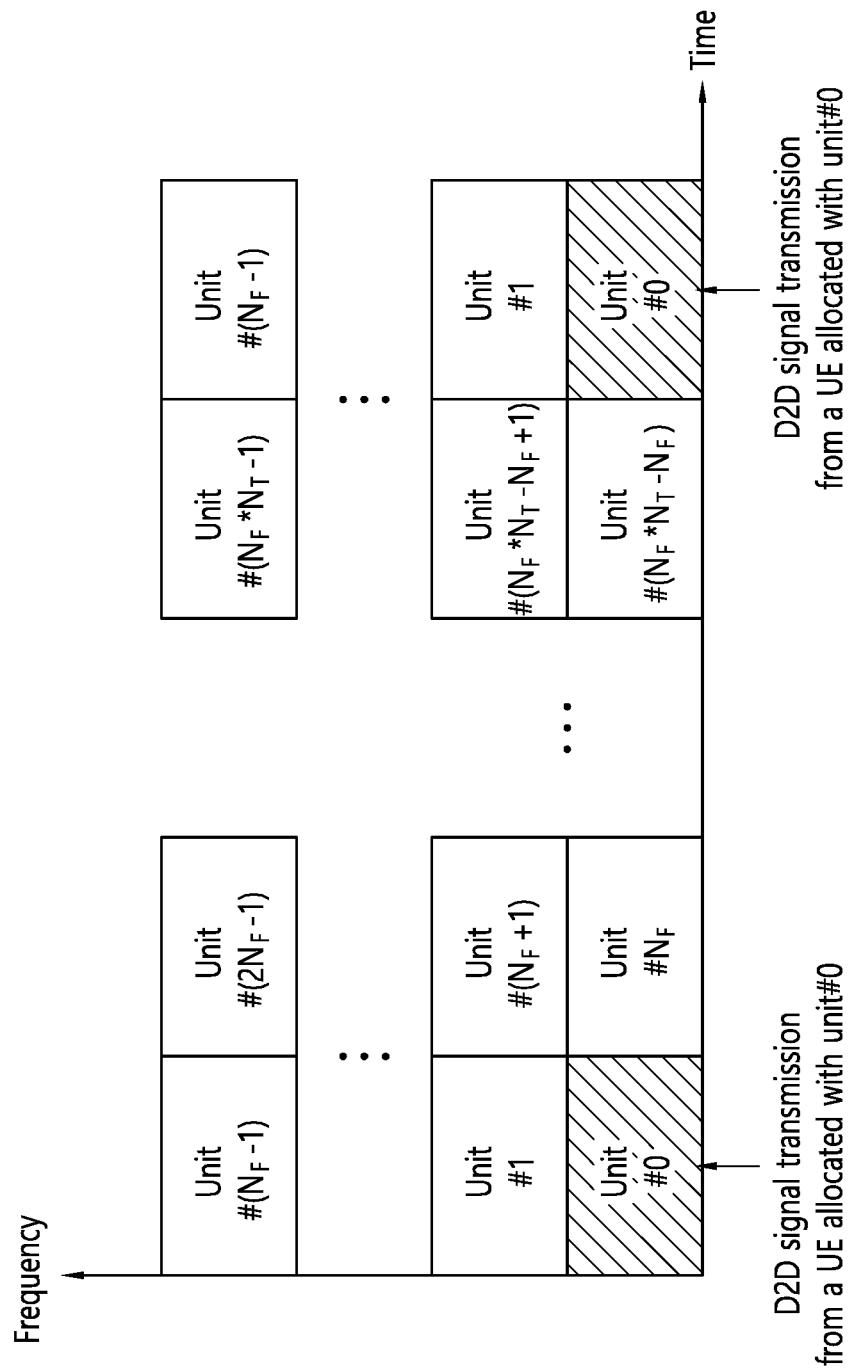
FIG. 12 illustrates an example of a configuration of resource units.

FIG. 12 illustrates an example of a configuration of resource units.

Referring to FIG. 12, the entire frequency resources of a resource pool may be divided into $N_F$ units, and the entire time resources of the resource pool may be divided into $N_T$ units, by which a total of $N_F \times N_T$ resource units may be defined within the resource pool.

At this time, it is assumed that the corresponding resource pool is repeated with a period of $N_T$ subframes.

As shown in FIG. 8, one resource unit (for example, Unit #0) may appear repeatedly at regular intervals. Similarly, to obtain a diversity effect in the time or frequency dimension, the index of a physical resource unit to which one logical resource unit is mapped may vary according to a predetermined pattern as time elapses. In the aforementioned resource unit structure, a resource pool may indicate a set of resource units available for transmission, which may be used by a UE attempting to transmit a D2D signal.

A resource pool may be subdivided into various types. For example, the resource pool may be classified according to the content of a D2D signal transmitted from each resource pool. Each resource pool may be classified as follows, where each resource pool may transmit a D2D signal of which the content is described below.

1) Scheduling Assignment (SA) resource pool or D2D (sidelink) control channel: A resource pool by which each transmitting UE transmits a signal including information about the resource position of a D2D data channel transmitted from a succeeding or the same subframe and information required for demodulation of the other data channels (for example, information about modulation and coding scheme (MCS), MIMO transmission scheme, and timing advance).

The signal described in 1) may be transmitted together with D2D data after being multiplexed on the same resource unit. In this case, an SA resource pool may indicate a resource pool to which SA is transmitted by being multiplexed with D2D data. The SA resource pool may also be called a D2D (sidelink) control channel.

2) D2D data channel: A resource pool by which a transmitting UE transmits user data by using a resource designated through SA. If it is possible that D2D data and SA information are multiplexed and transmitted together on the same resource unit, a resource pool for a D2D data channel may transmit only the D2D data channel in such a way to exclude the SA information. In other words, the D2D data channel resource pool still uses the resource element which has been used for transmitting SA information on the basis of individual resource units within the SA resource pool.

3) Discovery channel: A resource pool for messages by which a transmitting UE transmits information such as its identity (ID) so that a neighboring UE may discover the transmitting UE.

Even if a D2D signal carries the same content as described above, a different resource pool may be utilized depending on the transmission and reception attributes of the D2D signal. As one example, even if the same D2D data channel or the same discovery message is transmitted, the resource pool may be further classified into another different resource pool depending on a scheme for determining transmission timing of the D2D signal (for example, whether the D2D signal is transmitted at the time of receiving a synchronization reference signal or transmitted after a predetermined timing advance is applied at the time of receiving the synchronization reference signal), resource allocation scheme (for example, whether a transmission resource of an individual signal is allocated by an eNB for each individual transmitting UE or whether an individual transmitting UE selects an individual signal transmission resource by itself within the resource pool), signal format (for example, the number of symbols occupied by each D2D signal in one subframe or the number of subframes used for transmission of one D2D signal), strength of a signal from the eNB, or transmission power intensity of a D2D UE).

As described above, the method in D2D communication for indicating a transmission resource of a D2D transmitting UE directly by the eNB may be called a mode 1 while the method for selecting a transmission resource directly by the UE, where a transmission resource region is predetermined or the eNB designates the transmission resource region, may be called a mode 2.

In the case of D2D discovery, the case where the eNB directly indicates a resource may be referred to as type 2 while the case where the UE directly selects a transmission resource from a predetermined resource region or a resource region indicated by the eNB may be referred to as type 1.

Meanwhile, the D2D may also be called sidelink. The SA may also be called a physical sidelink control channel (PSCCH), and D2D synchronization signal may also be called a sidelink synchronization signal (SSS). A control channel which transmits the most basic information before initiation of D2D communication is referred to as a physical sidelink broadcast channel (PSBCH), where the PSBCH may be transmitted together with an SSS and may alternatively called a physical D2D synchronization channel (PD2DSCH). A signal notifying that a specific UE is located in the vicinity may include an ID of the specific UE, and a channel to which such a signal is transmitted may be called a physical sidelink discovery channel (PSDCH).

In the D2D communication, only the D2D communication UE transmits a PSBCH together with an SSS, and in this reason, measurement of an SSS has been performed by using a demodulation reference signal (DM-RS) of the PSBCH. A UE in the out-coverage area may measure the DM-RS of the PSBCH and measure reference signal received power (RSRP) of the signal to determine whether the UE itself operate as a synchronization source.

In the 3GPP LTE system, the time needed to transmit user data or control information from one subframe is called transmission time interval (TTI). The TTI of the current LTE system is 1 millisecond (ms) for most cases.

However, in a next-generation wireless communication system for coping with a channel environment changing fast due to a higher data rate, high speed of a vehicle UE mounted in a vehicle, and so on, the current TTI of 1 ms may not be suitable for low latency requirement. Therefore, instead of using the conventional TTI, it may be needed to satisfy the low latency requirement by employing a short TTI (which may also be called an S-TTI) consisting of a smaller number of symbols. The conventional TTI (1 ms) may be referred to as L-TTI in contrast to the S-TTI.

A change may be needed in the conventional design of a demodulation-reference signal (DM-RS) of sidelink for LTE vehicle-to-everything (V2X) communication. In other words, when an S-TTI comprising a smaller number of symbols is used, a design change such as change of the number of symbols in the legacy DM-RS may be required. In this case, automatic gain control (AGC), timing advance (TA), and frequency offset may be taken into account.

In what follows, a new design of the DM-RS in the sidelink of the LTE system will be described. The new design may be applied, for example, when an S-TTI is used for sidelink communication.

Figure 13:
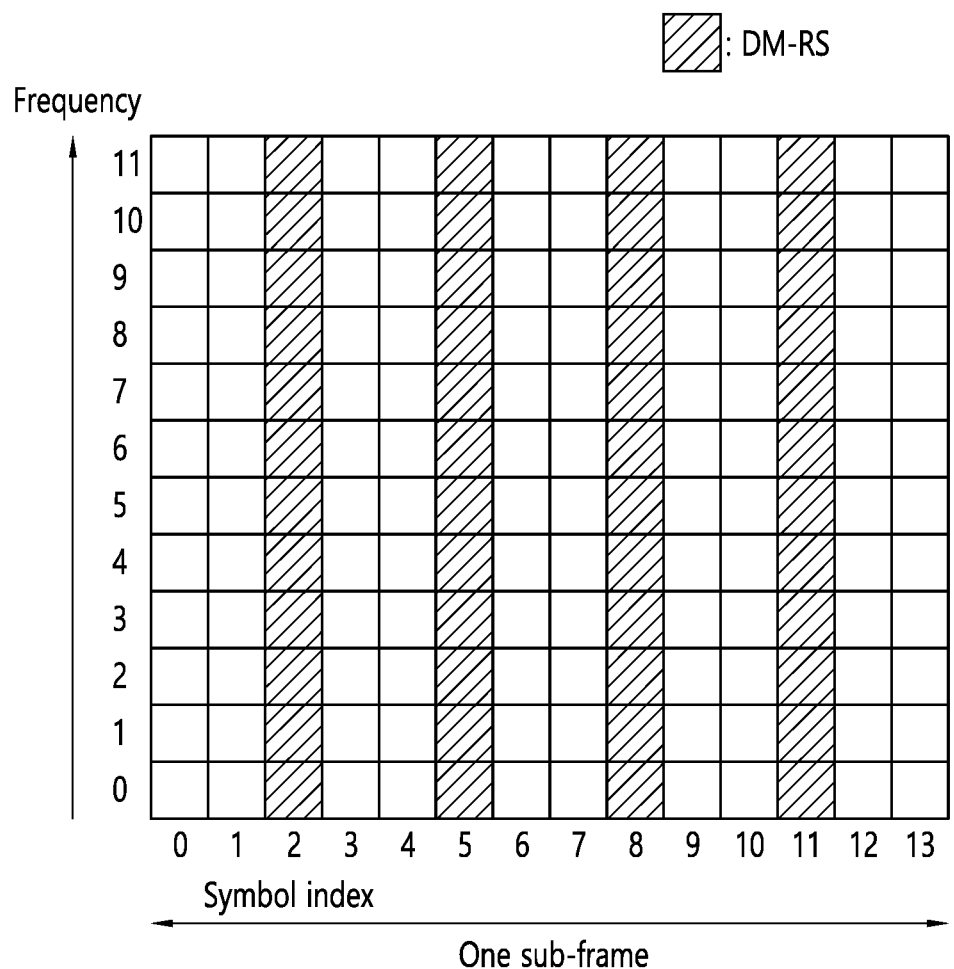
FIG. 13 illustrates one example of a DM-RS structure for a normal CP in the V2X communication.

In the LTE V2X communication, a subframe structure based on the legacy LTE PUSCH structure may be utilized, where FIG. 13 shows the DM-RS structure for a normal CP within a subframe.

FIG. 13 illustrates one example of a DM-RS structure for a normal CP in the V2X communication.

Referring to FIG. 13, if 14 symbols belonging to a subframe are indexed sequentially from 0 to 13, a DM-RS may be transmitted through the symbol #2, 5, 8, and 11. In other words, the DM-RS may be mapped to the symbol #2, 5, 8, and 11 of the subframe.

The current DM-RS structure as described above uses 4 DM-RSs during one TTI (1 ms) with spacing of 2 symbols to compensate for the frequency offset of +/−0.4 ppm in a vehicle UE moving with a high speed at 5.9 GHz for V2X communication.

Figure 14:
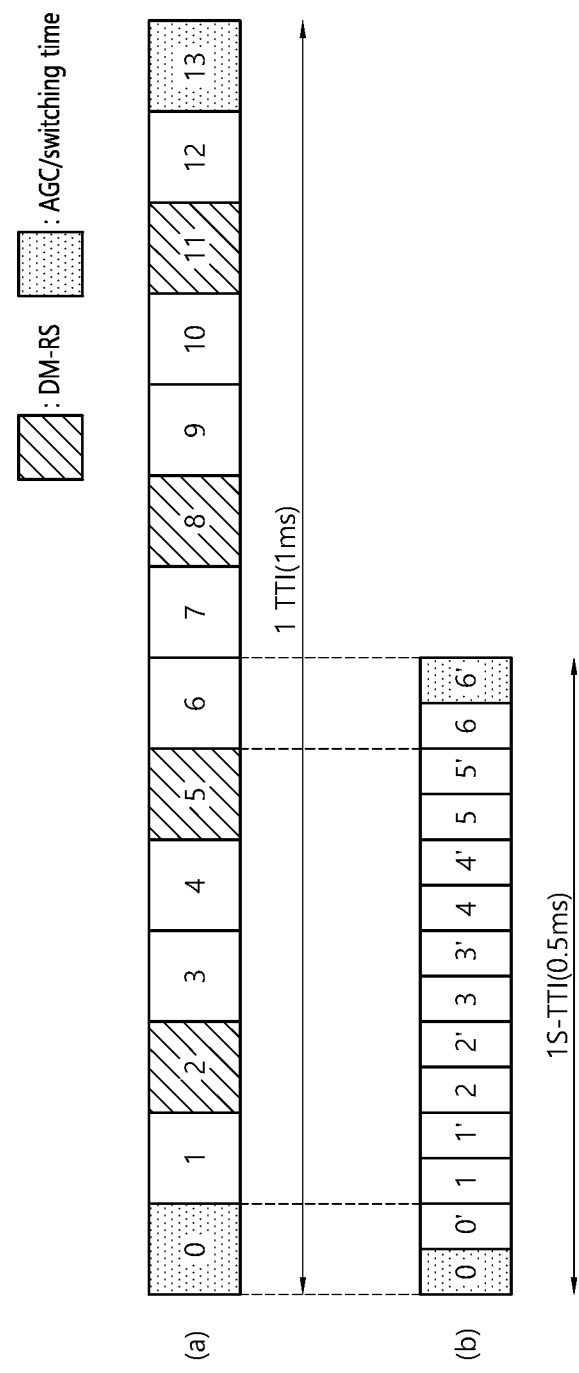
FIG. 14 illustrates an L-TTI and an S-TTI for the purpose of comparison.

FIG. 14 illustrates an L-TTI and an S-TTI for the purpose of comparison.

Referring to FIG. 14(a), an OFDM symbol using a normal CP may use 14 symbols during one L-TTI (1 ms), which may be numbered with a symbol number ranging from 0 to 13. One symbol time is 70 ρs (microsecond) for the case of symbol #0 while it is about 66.6 ρs for the other symbols. At this time, a total of 8 symbols comprising symbol #1, 3, 4, 6, 7, 9, 10, and 12 correspond to the region within the subframe, which may be used for data transmission in the sidelink communication.

The symbol #0 and the symbol #13 may be used sequentially for automatic gain control (AGC) and transmission/reception switching. However, the time required for actual AGC may occupy about 30 μs out of 70 μs of the symbol #0, and in the same way, the transmission/reception switching time may require a similar amount of time (about 30 ρs).

If 1 S-TTI is configured to occupy half of 1 ms, 0.5 ms (namely 1 slot) and to have 14 symbols within the time period of 0.5 ms, the 1 S-TTI (1 slot) may be constructed as shown in FIG. 14(b). At this time, the 14 symbols within 1 S-TTI may be indexed as shown in FIG. 14(b). As shown in FIG. 14(b), the present disclosure may describe a DM-RS design for the remaining symbols except for the symbol #0 and the symbol #6' in the S-TTI lasting 0.5 ms.

Figure 15:
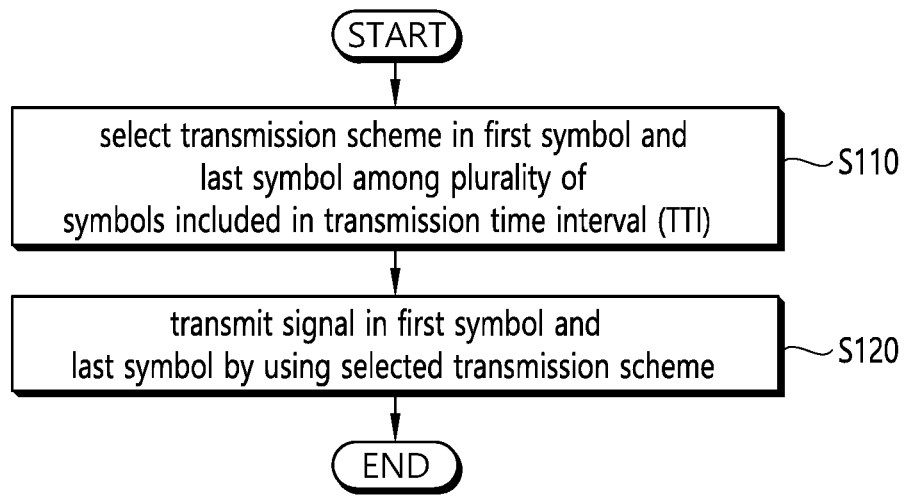
FIG. 15 shows a signal transmission method of a UE according to an embodiment of the present disclosure.

FIG. 15 shows a signal transmission method of a UE according to an embodiment of the present disclosure.

Referring to FIG. 15, the UE selects a transmission scheme in a first symbol and a last symbol among a plurality of symbols included in a transmission time interval (TTI) (Silo).

The UE transmits the signal in the first symbol and the last symbol by using the selected transmission scheme (S120).

The first transmission scheme may be a transmission scheme in which the signal is transmitted by using one symbol determined for a first subcarrier spacing in a time domain and subcarriers spaced apart with a specific interval in a frequency domain (i.e., by using a comb-like pattern). For example, the first transmission scheme may be a transmission scheme in which the signal is transmitted by using a time length of a symbol determined for 15 kHz in the time domain and even-numbered subcarriers or odd-numbered subcarriers in the frequency domain.

The second transmission scheme may be a transmission scheme in which the signal is transmitted by using one symbol determined for a second subcarrier spacing in the time domain and subcarriers consecutive in the frequency domain.

When using the first transmission scheme (also referred to as a type A), by using that a signal is repeated in the time domain, a receiving end may use a half of repeated time-domain signals as AGC, and may use the other half as data or a reference signal.

The second transmission scheme (also referred to as a type B) may use a shorter TTI than a legacy LTE system, and this may cause a change in a subcarrier spacing, which may result in an increase in UE complexity. Therefore, it may be considered to apply the scheme to an advanced UE. When first/last symbols are configured in the same format, the same transmission scheme is used, thereby advantageously decreasing implementation complexity.

A length in a time domain of the first symbol and last symbol may be a time length determined for a case where a subcarrier spacing is 15 kHz.

The second subcarrier spacing may been times (where n is a natural number greater than or equal to 2) the first subcarrier spacing. For example, if the first subcarrier spacing is 15 kHz, the second subcarrier spacing may be 30 kHz(n=2), 45 kHz(n=3), 60 kHz(n=4), etc. In this case, a length in a time domain of one symbol determined for the second subcarrier spacing may be 1/n times a length in a time domain of one symbol determined for the first subcarrier spacing.

Figure 16:
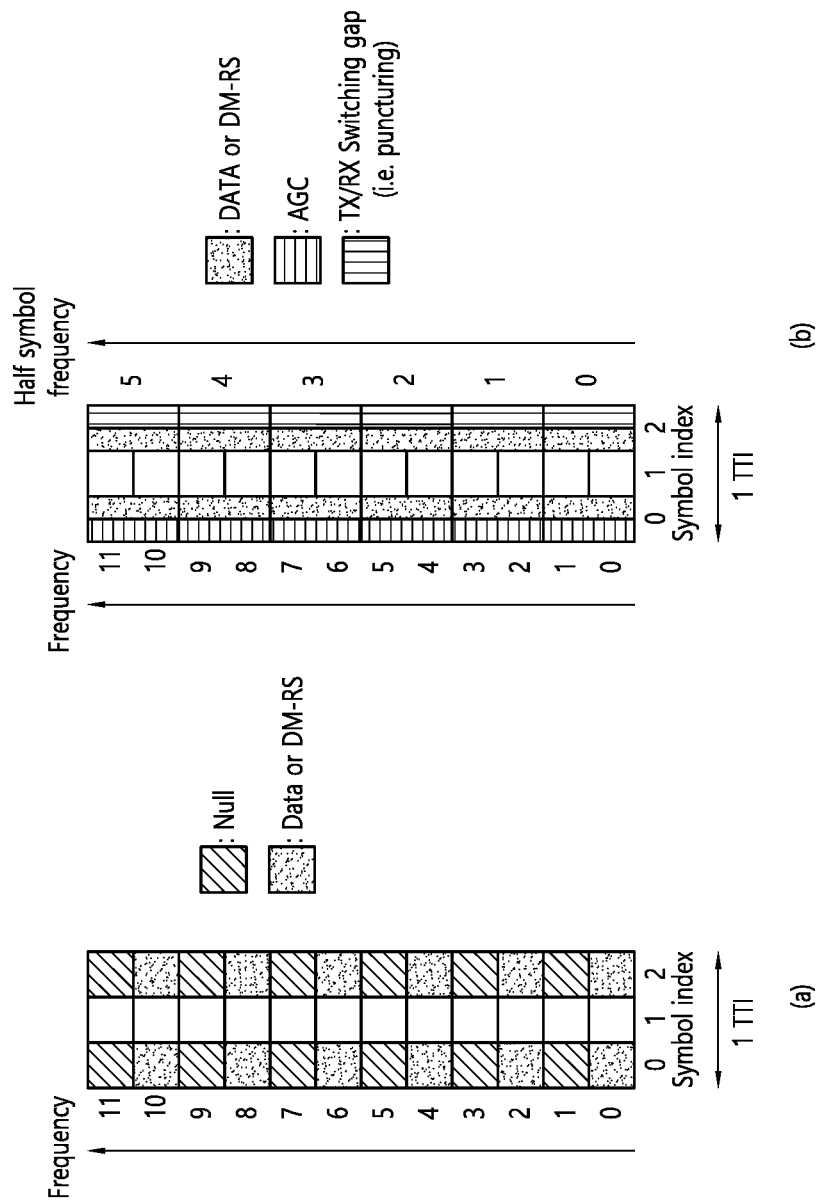
FIG. 16 shows a comparison of a first transmission scheme (type A) and a second transmission scheme (type B).

FIG. 16 shows a comparison of a first transmission scheme (type A) and a second transmission scheme (type B).

Referring to FIG. 16, one TTI may include, for example, three symbols. However, this is only an example for convenience of explanations, and one TTI may include three or more symbols. It is assumed that each symbol has a time length defined in a case where a subcarrier spacing is 15 kHz.

In a first symbol and/or last symbol of TTI, a UE may transmit a signal, for example, data and/or a reference signal (e.g., DM RS) by using the aforementioned first transmission scheme (type A) or second transmission scheme (type B).

If the first transmission scheme (type A) is applied, as shown in FIG. 16(a), data or a reference signal may be transmitted by being mapped in a comb-like type in a first symbol and/or a last symbol. When data is transmitted in the first symbol or last symbol within 1 TTI by using the first transmission scheme (type A), a mapping method may use, for example, one of the following two methods.

In a first method, a DFT spreading size may be used by half in a symbol in which mapping is achieved in a comb-like type. That is, only resource elements (REs) having data which is not 0 (zero) may be collected to perform DFT spreading on a size of the REs, and thereafter mapping may be performed by skipping the REs one by one in an actual subcarrier mapping step. If IFFT is performed in this state, a signal repeated in a time domain is produced.

In a second method, mapping may be performed first by including 0 (zero), and a DFT size may be the same as in another symbol. In this case, two sequences repeated in a frequency domain are produced. For one of the repeated sequences, 0 (zero) may be inserted in a comb type in the frequency domain and thereafter subcarrier mapping may be performed. In doing so, a signal repeated twice in the time domain is produced as a result of IFFT, and thus a half of the signals may be used for AGC in a receiving end.

Meanwhile, if the second transmission scheme (type B) is applied, as shown in FIG. 16(b), one symbol is divided by a smaller symbol unit (e.g., a time length of a symbol defined when a subcarrier spacing is 30 kHz) to use some of the symbols, and data or a reference signal (e.g., DM RS) may be transmitted by using subcarriers consecutive in a frequency domain.

Meanwhile, when the UE transmits a DM RS for vehicle-to-everything (V2X) communication by using specific resources, the specific resources may include a resource in the first symbol.

Figure 17:
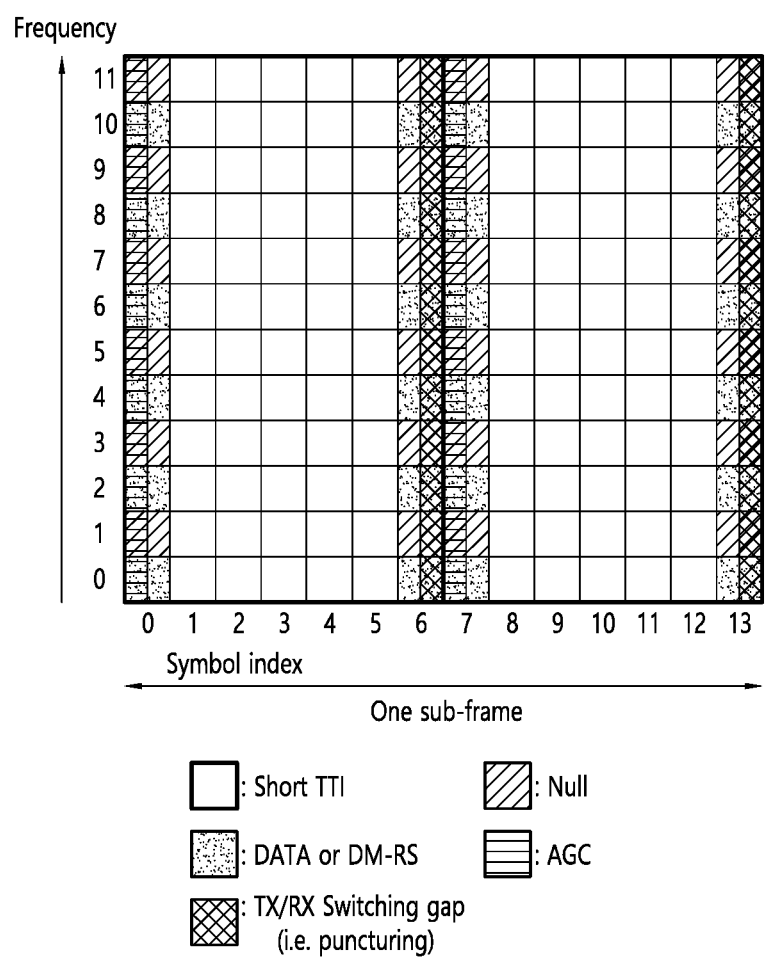
FIG. 17 shows an example of DM-RS mapping according to a first transmission scheme.

FIG. 17 shows an example of DM-RS mapping according to a first transmission scheme.

Referring to FIG. 17, first/last 1 symbols to be used for AGC or switching time in 1 S-TTI (0.5 ms) (herein, 1 symbol may have a time length determined for a 15 kHz subcarrier spacing) may be symbols #0 and #6 or symbols #7 and #13. In this case, in the first/last 1-symbols, data or a reference signal (e.g., DM RS) may be transmitted by using the aforementioned first transmission scheme (type A) or second transmission scheme (type B).

In case of using the first transmission scheme (type A), data or a reference signal may be transmitted by using (in a comb type) the symbols #0 and #6 in the 1 S-TTI in terms of a time domain and even-numbered subcarriers in terms of a frequency domain.

As such, when mapping is achieved in a comb-type pattern, empty REs are produced in the frequency domain. If data is not transmitted in this RE, the RE may be subjected to rate matching or puncturing. The rate matching may be an operation in which a modulation symbol is mapped sequentially only to an available RE other than an RE that cannot be actually used. The puncturing may be an operation in which a modulation symbol is mapped by assuming that all REs are available, and thereafter a corresponding signal is not transmitted by a transmitter or is emptied by a receiver. That is, the rate matching may be an operation of removing an RE that cannot be used in a process of mapping data to a resource, whereas the puncturing may be an operation in which the mapping process is performed by including the RE that cannot be used but a signal is not transmitted actually in the RE that cannot be used or even if it is transmitted, the signal is emptied in a corresponding resource in terms of an RX UE.

In FIG. 17, for each of the symbol #0 and the symbol #6, the empty REs in the frequency domain can be subjected to the rate matching or puncturing. Therefore, 4 cases are possible in total.

Figure 18:
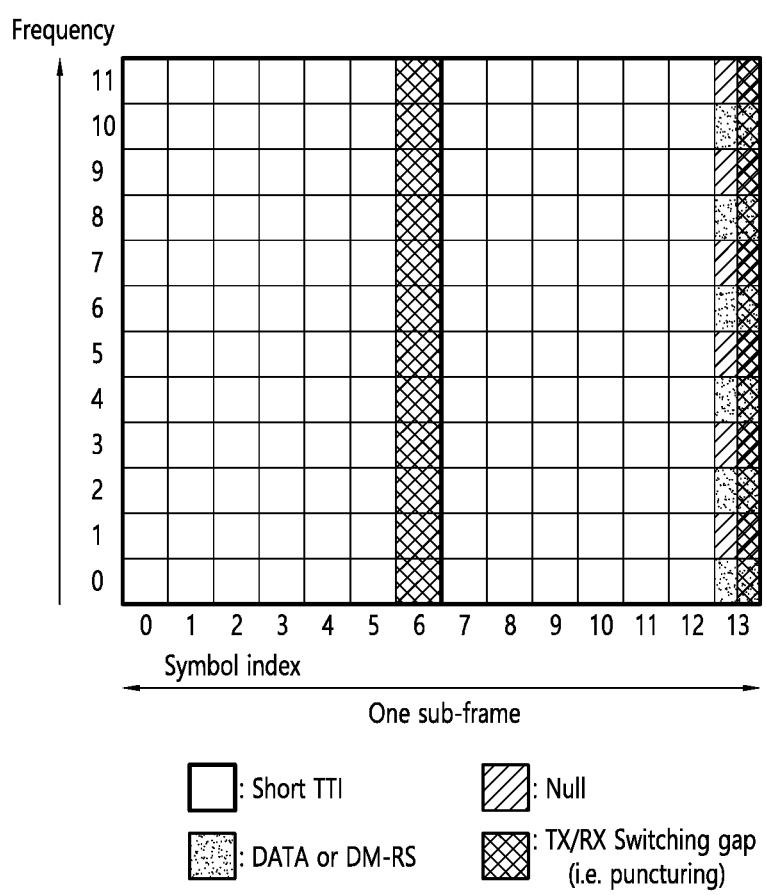
FIG. 18 shows another example of DM-RS mapping according to a first transmission scheme.

FIG. 18 shows another example of DM-RS mapping according to a first transmission scheme.

Referring to FIG. 18, two S-TTIs (i.e., slots) are included in one subframe. All of last symbols #6 of a first slot may be punctured for the usage of a switching time gap. In a last symbol #13 of a second slot, data or a reference signal may be transmitted in a comb-type pattern (i.e., the first transmission scheme or the type A).

This method may be applied when a legacy UE (e.g., LTE Rel-14 UE) not supporting S-TTI (0.5 ms) and an advanced UE (e.g., LTE Rel-15 UE) supporting S-TTI coexist. Even if the advanced UE transmits data or a reference signal in a comb type in the last symbol of the first slot, the legacy UE uses the last symbol of the first slot as normal data (that is, it is not recognized as comb-type data). Therefore, since a result of inverse fast Fourier transform (IFFT) in which a signal repeated twice in a time domain is expected cannot be guaranteed, the last symbol of the first slot is punctured. That is, only the symbol #13 which is the last symbol of the second slot is transmitted in a comb-type pattern and the symbol #6 which is the last symbol of the first slot is not transmitted in the comb-type pattern. This is because the legacy UE not supporting S-TTI will use the last symbol of the first slot for the usage of receiving data, and thus it is considered that, even if the advanced UE transmits the last symbol of the first slot in the comb-type pattern, the result of IFFT in which the signal repeated twice in the time domain is desired cannot be guaranteed.

In the symbols #1 to #5 and the symbols #8 to #12, data or a reference signal may be transmitted. In the symbols #0 and #7 to be used as AGC, data or a reference signal may be transmitted in a comb type (type A), may be transmitted through a half-symbol (type B), or may be transmitted in the conventional manner (1 symbol in a time domain, 15 kHz in a frequency domain).

Figure 19:
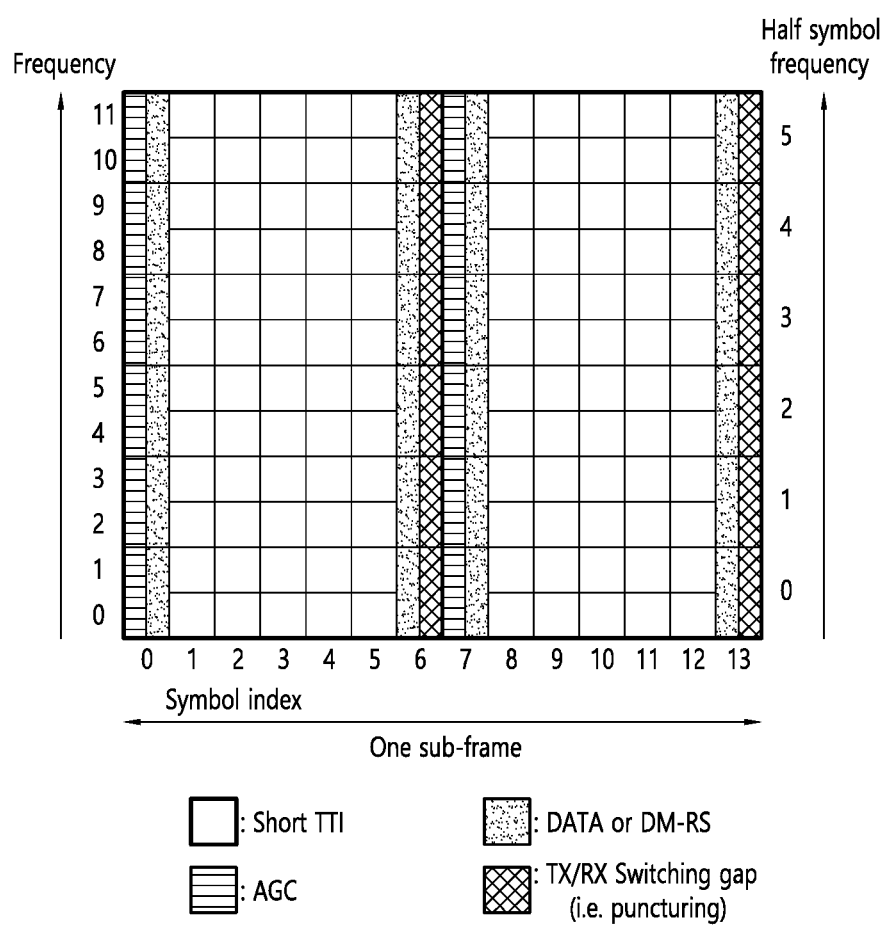
FIG. 19 shows an example of signal transmission using a second transmission scheme (type B).

FIG. 19 shows an example of signal transmission using a second transmission scheme (type B).

Referring to FIG. 19, a first/last symbol within 1 S-TTI may be transmitted using the second transmission scheme (type B). That is, a half-symbol may be used for the usage of data and DM-RS transmission respectively in symbols #0 and #6.

For example, when the half-symbol is used for the usage of data transmission in the symbol #0, repetitive data, a known signal, or any signal considering AGC may be transmitted in a front half-symbol of the symbol #0 so as to be used as an AGC signal in a receiving end.

When the half-symbol of the symbols #0 and #6 is used for the usage of DM-RS transmission, likewise, a repetitive reference signal may be disposed to a front half-symbol of the symbols #0 and #6 so as to be used for the usage of AGC, and at the same time, a gain for channel estimation for the other half-symbol may be acquired.

A transmission scheme of a first/last symbol for the usage of AGC and TX/RX switching time within 1 S-TTI is defined in the above description. Hereinafter, a data/DM-RS transmission scheme for the remaining symbols within the 1 S-TTI will be proposed on the premise of the aforementioned first transmission scheme and second transmission scheme (i.e., type A/B).

Transmission for data and DM-RS in the remaining symbols other than the first/last symbol within 1 S-TTI may use one of the following three schemes.

In a first scheme, a comb-type pattern (the aforementioned first transmission scheme or type A) is used. This scheme can be used for a specific purpose since a transmission data rate is reduced by half, for example, when data is transmitted.

In a second scheme, data and DM-RS are transmitted using a half-symbol (i.e., the aforementioned second transmission scheme or type B). This scheme can reduce design complexity, for example, when the DM-RS is transmitted using the type B.

In a third scheme, similarly to transmitting data and DM-RS in the legacy LTE, transmission is performed by using 15 kHz in a frequency axis and 1 symbol in a time domain. In this scheme, for example, only a first/last symbol is transmitted differently (e.g., the aforementioned first and second methods are used), and the remaining symbols within S-TTI are transmitted in the conventional manner.

Hereinafter, a DM-RS pattern design is proposed on the premise of the aforementioned content. Any one of the aforementioned first transmission scheme and second transmission scheme may be applied to a first/last symbol within 1 TTI, and one of the aforementioned three scheme may be applied to the other symbols.

First, a DM-RS pattern for a case of slot TTI (S-TTI) is proposed.

Figure 20:
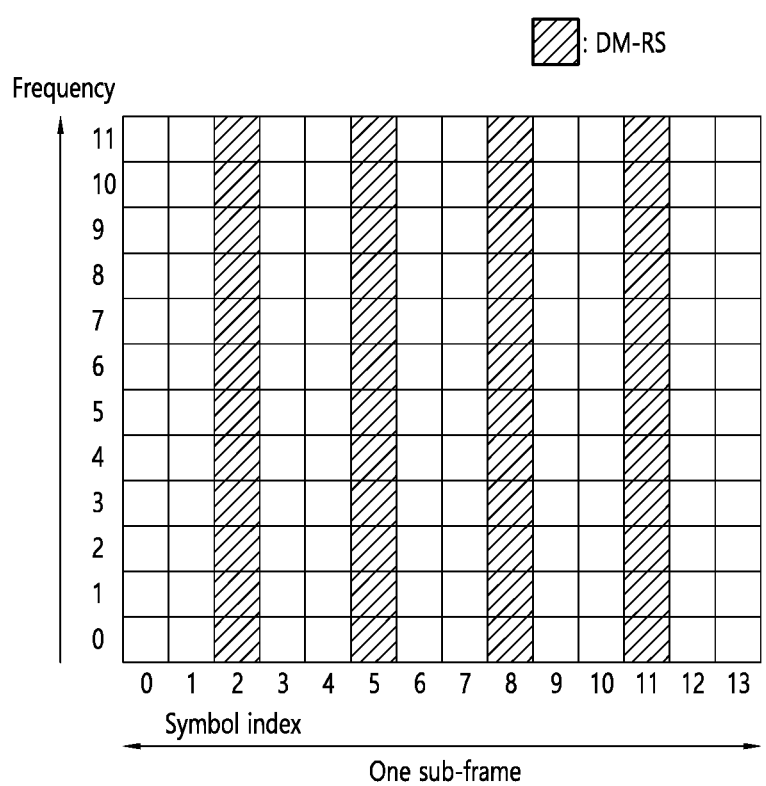
FIG. 20 shows an example of a DM-RS pattern within S-TTI.

FIG. 20 shows an example of a DM-RS pattern within S-TTI.

Referring to FIG. 20, each of symbols used as AGC and/or switching time within 1 S-TTI may be transmitted by using the first transmission scheme or the second transmission scheme.

Under this premise, as shown in FIG. 20, based on legacy sidelink DM-RS mapping (see FIG. 13), DM-RS of a symbol #5 of first S-TTI may be moved to a symbol #4, and DM-RS in a symbol #8 of second S-TTI may be moved to a symbol #9.

This method can be easily implemented since there is no change in a subcarrier spacing, and there is an advantage in that a spacing between DM-RSs in first S-TTI can be reduced and a frequency offset of channel estimation can be reduced by predicting puncturing of part of a symbol #6.

A spacing between DM-RSs can be reduced by moving a DM-RS of a symbol #8 to a symbol #9 because all of symbols #7 cannot be used due to AGC in second S-TTI. Transmitting of a first/last symbol used as AGC/switching time within one S-TTI in a comb type may refer to FIG. 17. In this case, data may not be transmitted in even-numbered or odd-numbered subcarriers in a frequency domain.

In addition, a scheme of transmitting the first/last symbol at 30 kHz of a half-symbol (i.e., the second transmission scheme or type B) may refer to FIG. 19. For example, a signal considering AGC or a repetitive signal may be transmitted in a front half-symbol of symbols #0 and #7, so as to be used as AGC. Although a 30 kHz subcarrier spacing is used for example in FIG. 19, it is also possible to use another subcarrier spacing by considering AGC timing.

Figure 21:
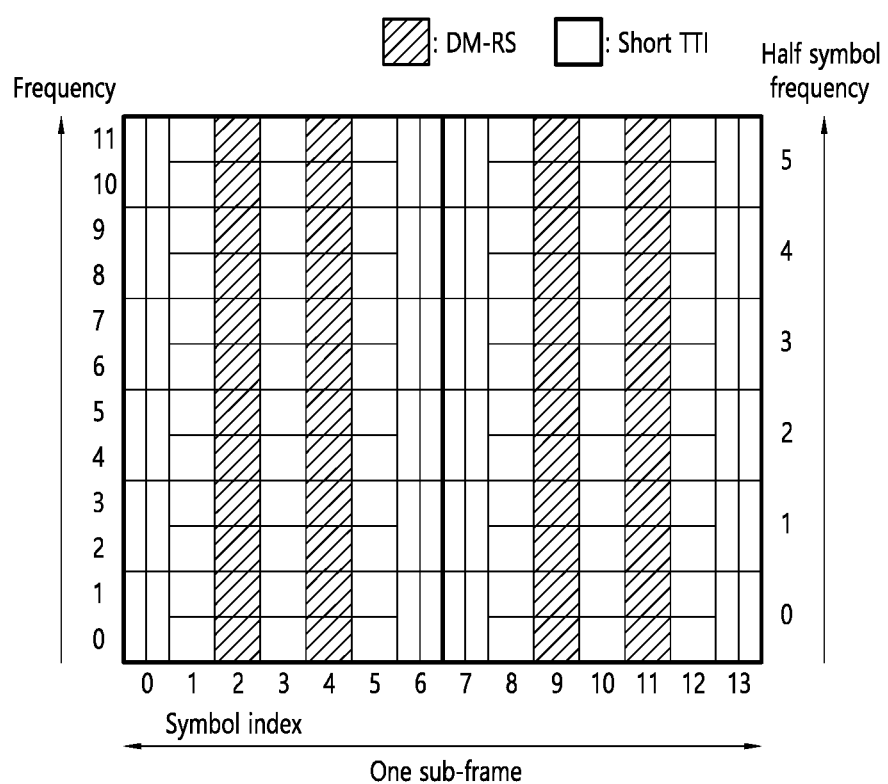
FIG. 21 shows another example of a DM-RS pattern within S-TTI.

FIG. 21 shows another example of a DM-RS pattern within S-TTI.

Referring to FIG. 21, based on legacy sidelink DM-RS mapping (see FIG. 13), DM-RS of a symbol #5 of first S-TTI may be moved to a symbol #4, and DM-RS in a symbol #8 of second S-TTI may be moved to a symbol #9. In addition, a second transmission scheme (type B) may be applied to symbols #0, 6, 7, and 13.

Figure 22:
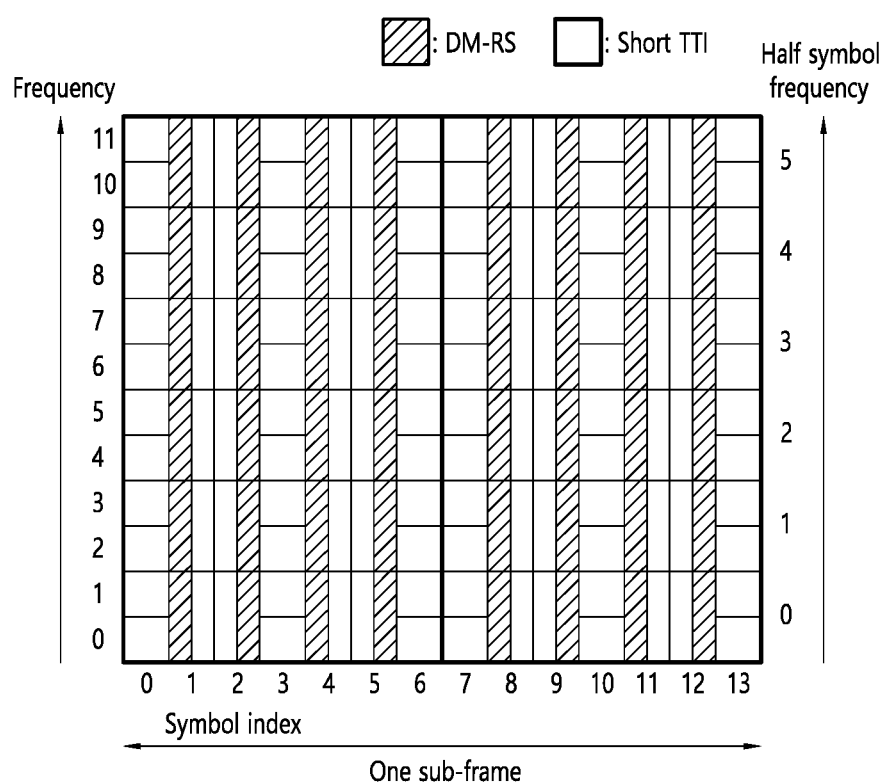
FIG. 22 shows another example of a DM-RS pattern within S-TTI.

FIG. 22 shows another example of a DM-RS pattern within S-TTI.

Referring to FIG. 22, mapping may be achieved within S-TTI by performing scaling in a time domain, while maintaining the existing DM-RS pattern in T n. If a 0.5 symbol for 15 kHz is regarded as one symbol, it may be considered that there are 14 symbols within S-TTI. The current sidelink DM-RS is mapped to symbols #2, #5, #8, and #11 within the TTI as shown in FIG. 13. Such a mapping pattern may be equally mapped to one S-TTI.

In doing so, advantages of 4 DM-RS mapping of a sidelink defined in the existing standardization can also be used in S-TTI.

Transmission of symbols #0 and #6 within one S-TTI is possible depending on the first transmission scheme or the second transmission scheme, and transmission for the other symbols (e.g., a symbol #3) may depend on any one of the aforementioned three schemes.

In FIG. 22, in symbols #1 and 4, although a half-symbol DM-RS is located in a front side of the symbol, it may also be located in a rear side of the symbol. Likewise, in symbols #2 and 5, although a half-symbol DM-RS is located in a rear side of the symbol, it may also be located in a front side of the symbol.

Figure 23:
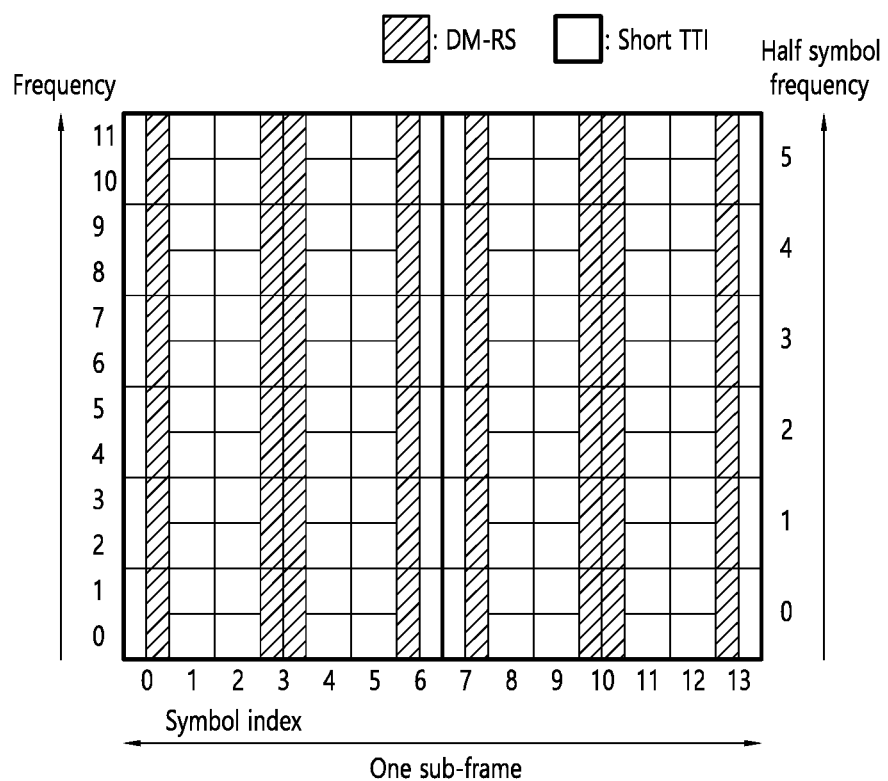
FIG. 23 shows another example of a DM-RS pattern within S-TTI.

FIG. 23 shows another example of a DM-RS pattern within S-TTI.

Referring to FIG. 23, a second transmission scheme (type B) may be applied so that, in a first symbol within one S-TTI, only a half-symbol may be used for AGC, and DM-RS may be transmitted in the other half-symbol. Likewise, in a last symbol (a symbol #6), a front half-symbol may be used as DM-RS, and the other half-symbol may be used for puncturing for switching time.

In a symbol #3, 1-symbol DM-RS may be transmitted, and by considering half-slot hopping, DM-RS may be transmitted in each of two half-symbols in the symbol #3. In doing so, even if the half-slot hopping is applied to a sidelink, there is an advantage in transmission/reception since the half-slots are symmetric to each other.

Figure 24:
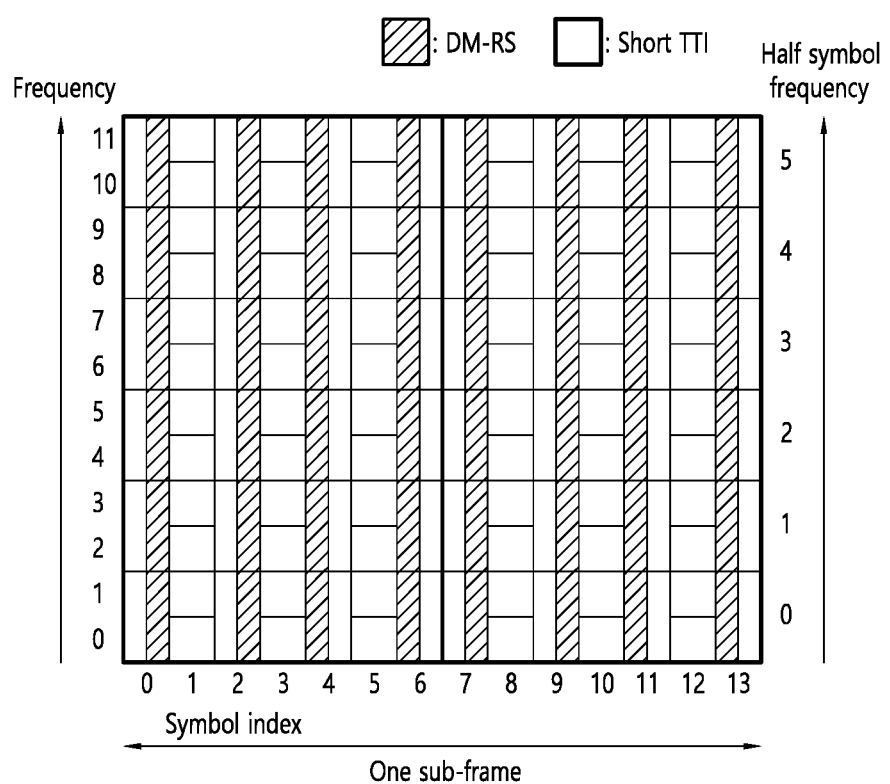
FIG. 24 shows another example of a DM-RS pattern within S-TTI.

FIG. 24 shows another example of a DM-RS pattern within S-TTI.

If 4:3 or 3:4 symbol hopping is performed instead of half-slot hopping, another DM-RS pattern design may be considered. As shown in FIG. 24, frequency offset correction may be considered and a half-symbol DM-RS may be uniformly distributed within each hopping time.

In FIG. 24, in a symbol #2, although a half-symbol DM-RS is located in a rear side of the symbol, it may also be located in a front side of the symbol. Likewise, in a symbol #4, although a half-symbol DM-RS is located in a front side of the symbol, it may also be located in a rear side of the symbol.

Figure 25:
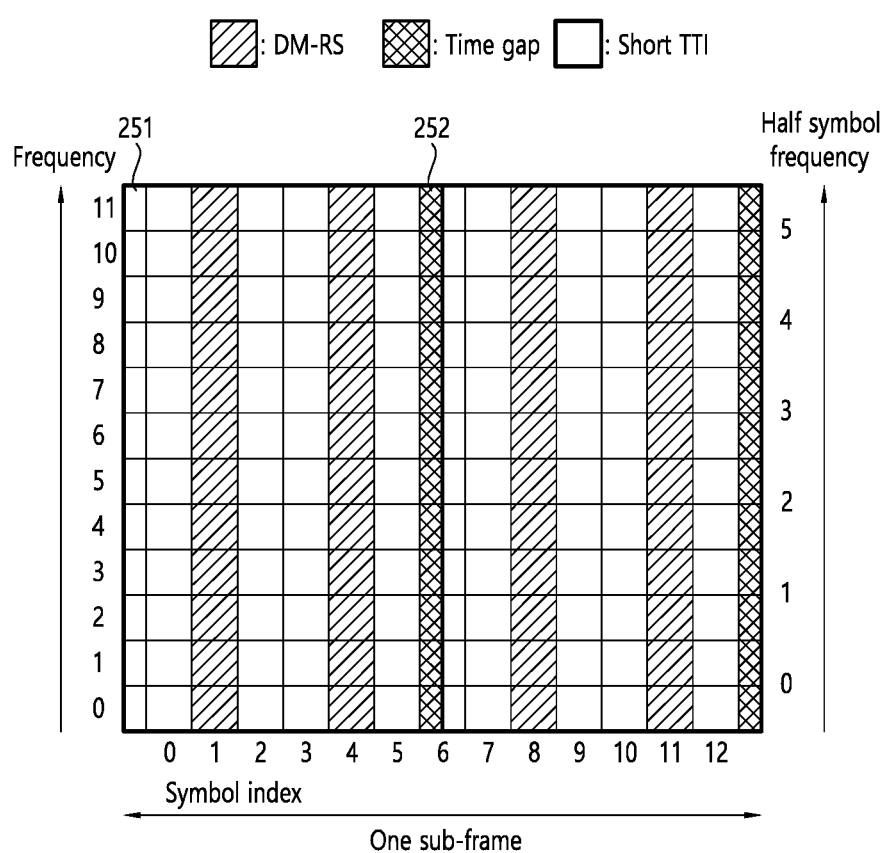
FIG. 25 shows another example of a DM-RS pattern within S-TTI.

FIG. 25 shows another example of a DM-RS pattern within S-TTI.

For a first/last symbol to be used as AGC/switching time in one S-TTI, a scheme which is not a comb-like pattern and not half-symbol transmission may be selected.

For example, as shown in FIG. 25, a new one-subframe index may be created by shifting a half-symbol in the legacy frame structure. Then, half-symbols remain in front or rear of 1 S-TTI. In this case, a rear half-symbol 242 may be used as switching time by regarding it as a time gap duration in which no signal is transmitted, and a front half-symbol 251 may be used as AGC in a receiving end by transmitting any signal. That is, data may be subjected to rate matching only for symbols #0 to 5 other than the front half-symbol 251 and the rear half-symbol 252, and the front half-symbol 251 may be used as AGC in the receiving end by transmitting an OFDM signal or any signal.

More specifically, the front half-symbol 251 can be used as AGC in the receiving end by mapping any data, followed by IFFT and transmission, for example, without having to consider transmission of a comb-like pattern or transmission of a half-symbol. Alternatively, it can be used as AGC by transmitting only any signal on a carrier without having to consider IFFT.

When a DM-RS is mapped to a symbol #1 and a symbol #4 within one S-TTI, one data symbol may be located at both sides of the DM-RS. Such a design can be implemented through time shift in the legacy frame structure without a change in a subcarrier spacing, thereby advantageously having low implementation complexity.

Figure 26:
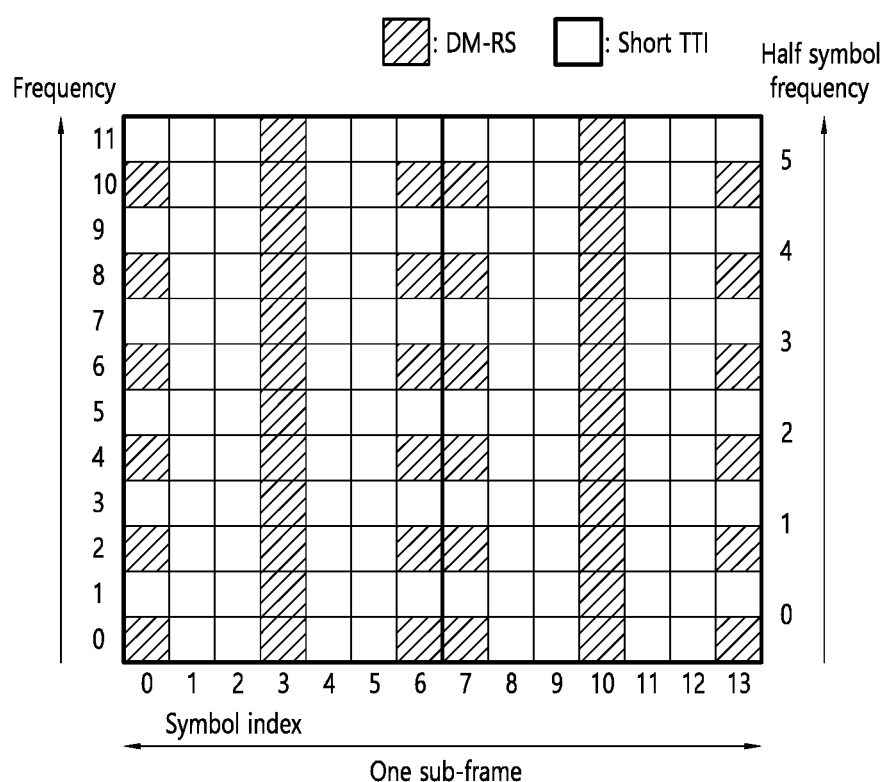
FIG. 26 shows another example of a DM-RS pattern within S-TTI.

FIG. 26 shows another example of a DM-RS pattern within S-TTI.

Referring to FIG. 26, a DM-RS may be transmitted using a first transmission scheme (type A) in each puncturing symbol due to AGC and/or switching time to be used in symbols #0 and 6 within one S-TTI, and the existing DM-RS transmission scheme (i.e., 15 kHz in a frequency axis, 1 symbol in a time axis) may be applied in a symbol #3.

When the DM-RS is transmitted with a comb-like pattern in the symbols #0 and #6, by using that a signal is repeated in the time domain, a receiving end may use a half of repeated time-domain signals as AGC or TX/RX switching time, and may use the other half as a DM-RS signal.

In a symbol #3 as a position at which DM-RSs can be transmitted with a 2-symbol spacing within S-TTI, the DM-RS may be transmitted to assist frequency offset correction. Although the DM-RS is mapped to an even-numbered frequency index (subcarrier) in a comb-like pattern for example in FIG. 26, mapping is also possible in an odd-numbered frequency index (subcarrier).

Figure 27:
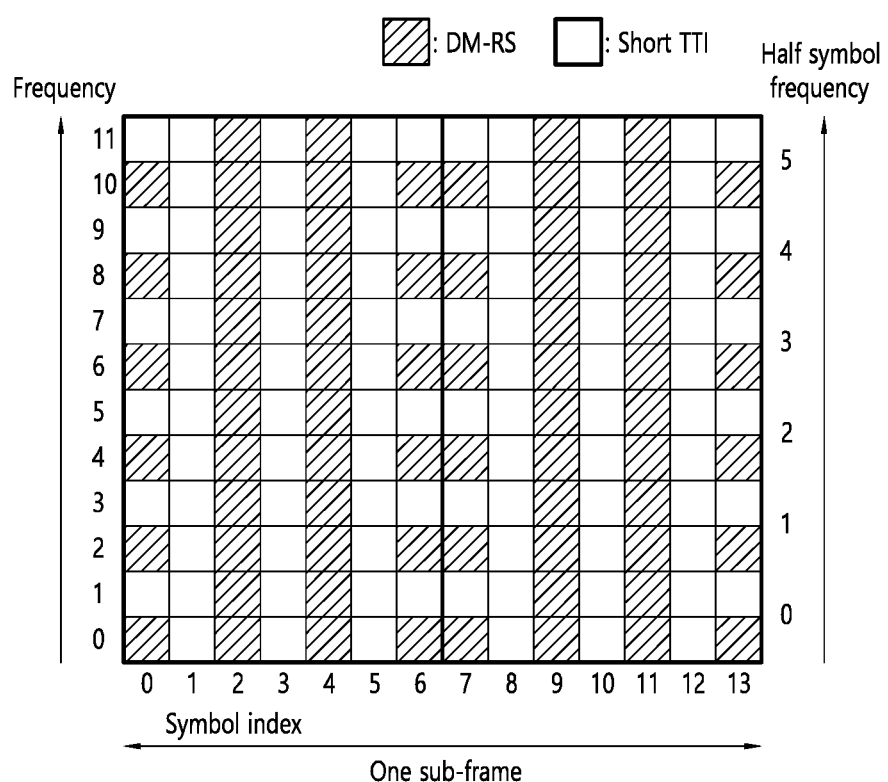
FIG. 27 shows another example of a DM-RS pattern within S-TTI.

FIG. 27 shows another example of a DM-RS pattern within S-TTI.

Referring to FIG. 27, a DM-RS of a comb-like pattern (i.e., a pattern using subcarriers spaced apart equidistantly) in a frequency domain may be transmitted in first and last symbols within S-TTI, and DM-RSs transmitted in the remaining symbols (symbols #2 and 4 in first S-TTI, symbols #9 and 11 in second S-TTI) may be transmitted by using consecutive subcarriers. It is necessary to map more DM-RSs to correct a frequency offset due to a high speed, and the present method may be applied in this case.

Figure 28:
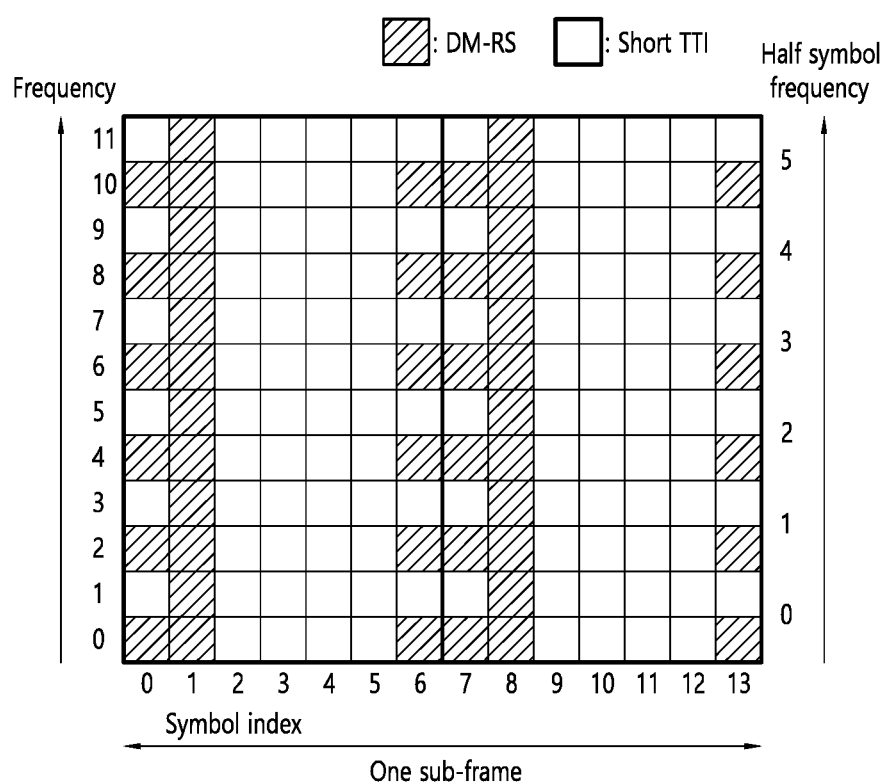
FIG. 28 shows another example of a DM-RS pattern within S-TTI.

FIG. 28 shows another example of a DM-RS pattern within S-TTI.

Referring to FIG. 28, a DM-RS may be transmitted through front symbols within S-TTI, which may be referred to as a front loaded DM-RS structure. The front-loaded DM-RS structure may be used to achieve low latency of a specific service.

The front-loaded DM-RS structure can obtain a channel estimation value in a front side of S-TTI, and can perform data demodulation more rapidly in a receiver by using the channel estimation value, thereby achieving lower latency.

When such a structure is used in the existing TTI (1 ms), link performance may deteriorate along with an increase in a speed of a UE (V-UE) installed in a vehicle. Otherwise, since a probability that channel coherence time is longer than a period of a DM-RS is increased in S-TTI, it may be applied for the purpose of achieving low latency.

Figure 29:
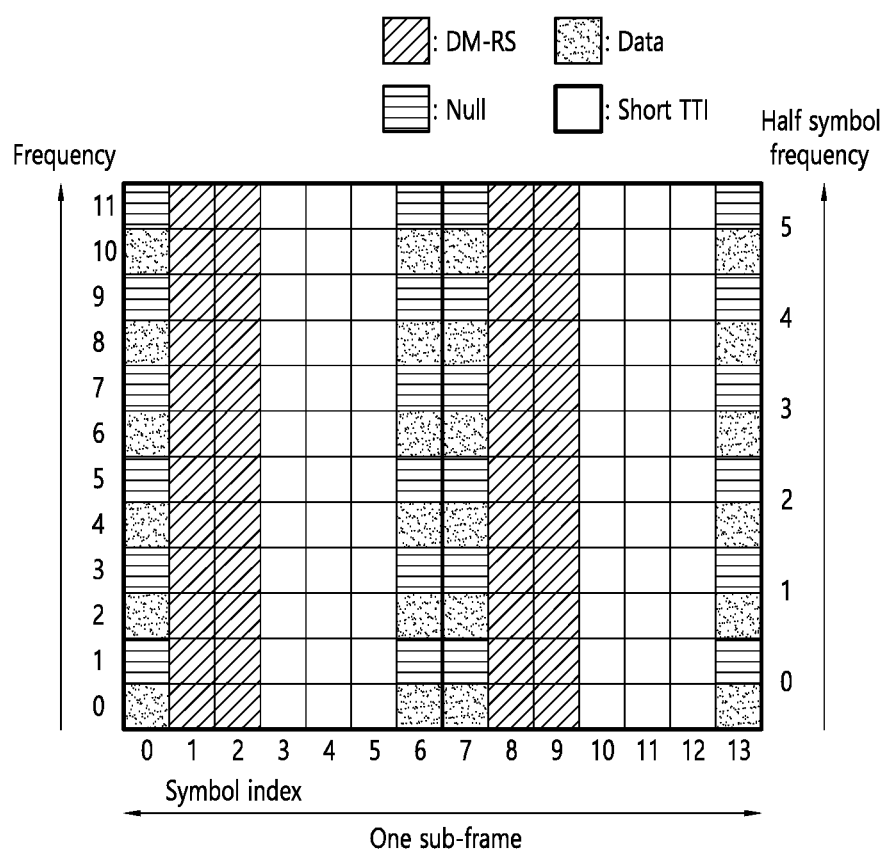
FIG. 29 shows another example of a DM-RS pattern within S-TTI.

FIG. 29 shows another example of a DM-RS pattern within S-TTI.

Referring to FIG. 29, data is transmitted using a comb-like pattern structure (a first transmission scheme or a type A) in a first/last symbol of first S-TTI, and a DM-RS is transmitted in symbols #1 and 2 (symbols #8 and 9 in second S-TTI). FIG. 29 is also an example of the front-loaded DM-RS structure.

Figure 30:
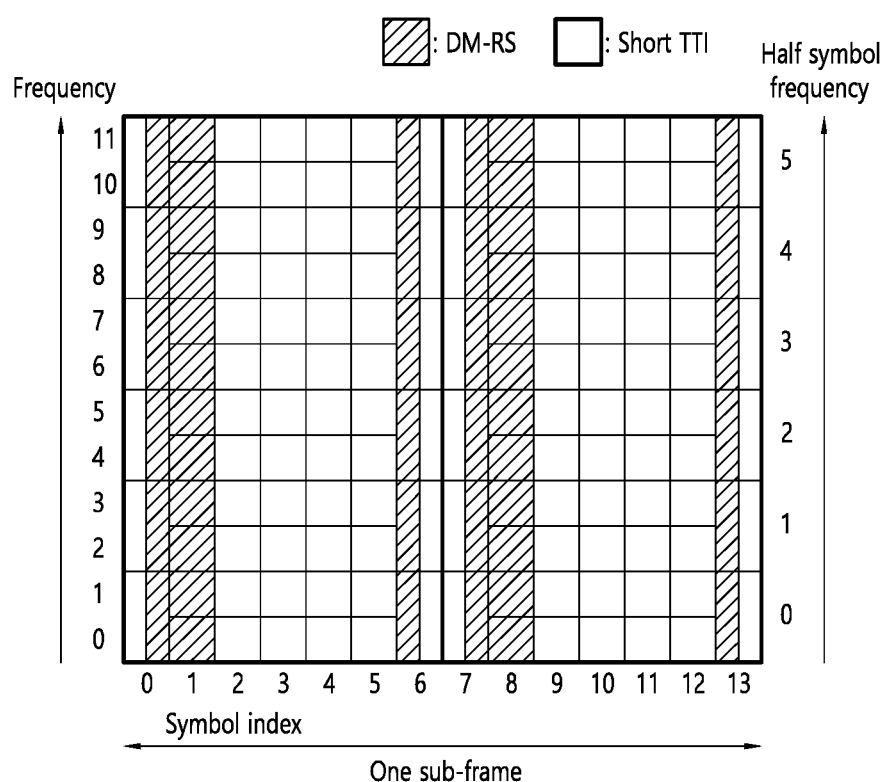
FIG. 30 shows another example of a DM-RS pattern within S-TTI.

FIG. 30 shows another example of a DM-RS pattern within S-TTI.

Referring to FIG. 30, a DM-RS is transmitted using a second transmission scheme or a type B in a first/last symbol of first S-TTI, and a DM-RS is transmitted in a symbol #1 (a symbol #8 in second S-TTI). FIG. 30 is also an example of the front-loaded DM-RS structure.

Figure 31:
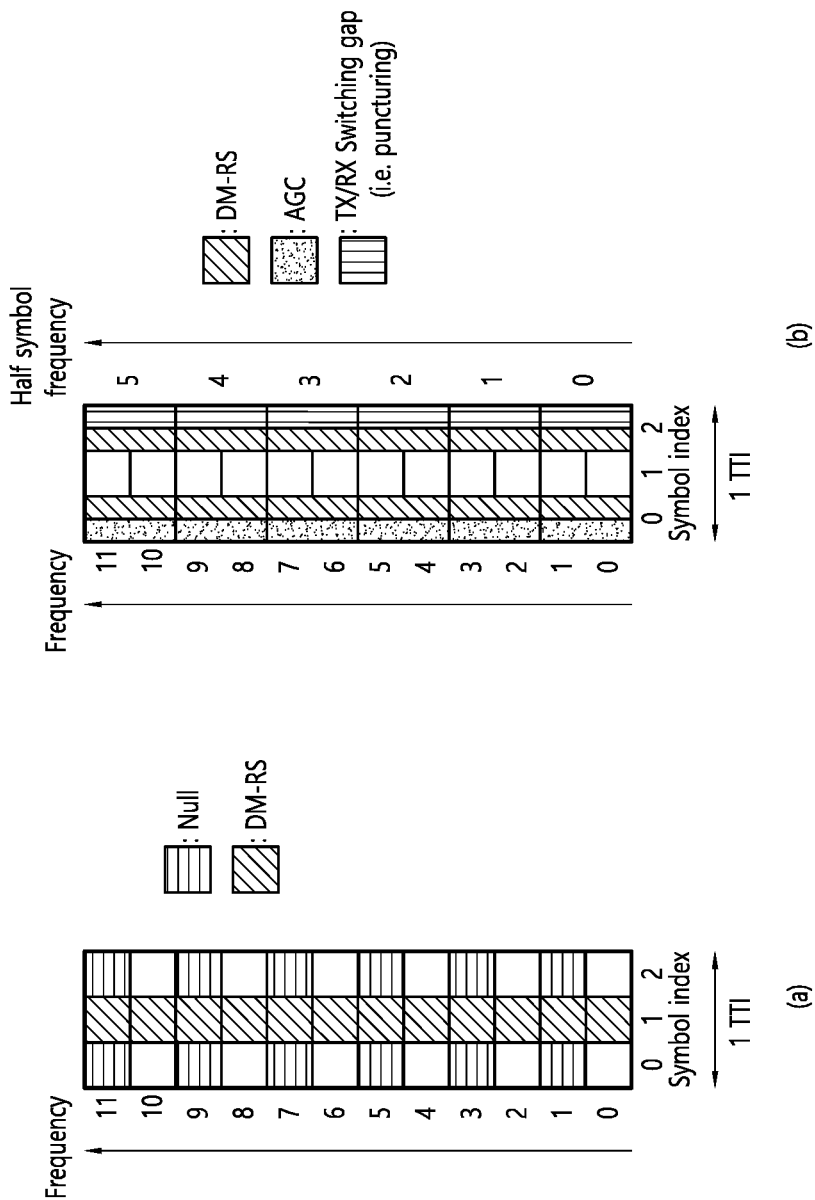
FIG. 31 shows another example of a DM-RS pattern within S-TTI.

FIG. 31 shows another example of a DM-RS pattern within S-TTI.

Referring to FIG. 31, it is assumed that one S-TTI is constructed of three symbols (it is assumed that each symbol is a symbol having a symbol time length defined for 15 kHz).

In case of the 3-symbol TTI, as shown in FIG. 31(a), data may be mapped using a first transmission scheme (type A) in first (initial)/last symbols #0 and #2, and a DM-RS may be transmitted through a center symbol #1. Such a structure is possible because a size of packet to be transmitted is small when using a short TTI such as three symbols. Alternatively, an RS (DM-RS) may be transmitted using a first transmission scheme (type A) in the first (initial)/last symbol of S-TTI, and data may be transmitted in the center symbol.

Alternatively, as shown in FIG. 31(b), a DM-RS or data may be transmitted using the second transmission scheme (type B) in the first (initial)/last symbols #0 and #2 within S-TTI. In this case, a subcarrier spacing is variable.

Figure 32:
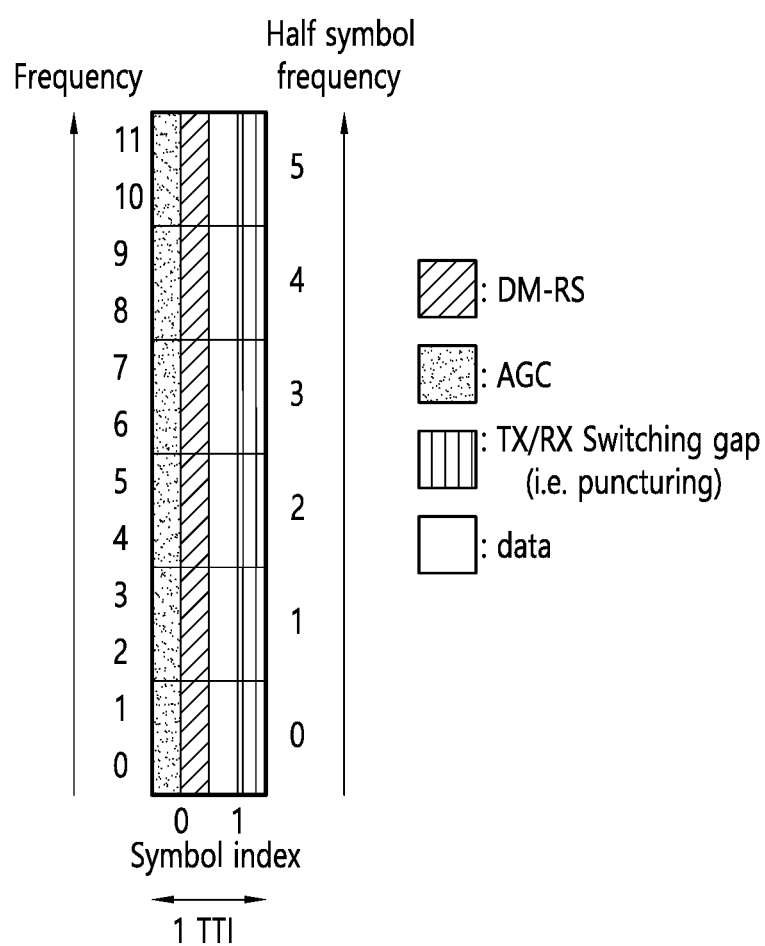
FIG. 32 shows another example of a DM-RS pattern within S-TTI.

FIG. 32 shows another example of a DM-RS pattern within S-TTI.

Referring to FIG. 32, it is assumed that one S-TTI is constructed of two symbols (it is assumed that each symbol is a symbol having a symbol time length defined for 15 kHz).

As such, a symbol unit can be reduced when 2-symbol T is used. That is, as shown in FIG. 32, each symbol may be divided into two 0.5 symbols to secure AGC and TX/RX switching time (gap), and a front half-symbol of a symbol #0 may be used as the AGC, and a rear half-symbol of a symbol #1 may be used as the switching time (gap). In this case, a DM-RS and data may be mapped respectively to the remaining regions. Alternatively, the DM-RS and the data may be mapped in the reverse order of FIG. 32.

The schemes described respectively in FIG. 31 and FIG. 32 may be cross-used within a subframe. For example, one subframe may be constructed of 14 symbols, and the 14 symbols may be constructed by combining a 2-symbol TTI and a 3-symbol TTI. Advantageously, a limitation in which the 14 symbols cannot be constructed of only the 3-symbol TTI can be solved, and more DM-RSs can be used.

The schemes proposed above may be necessary structures in a wireless communication system supporting multiple (/variable) TTIs. A TX UE may support a plurality of TTIs proposed above under a specific condition. The specific condition may be based on, for example, a specific channel busy ratio (CBR), a speed of a vehicle UE, a specific ProSe per-packet priority (PPPP) (herein, the PPPP may be mapped to a specific service), a type of a packet service, quality of service (QoS), a type of the vehicle UE, or the like.

If the multiple (/variable) TTIs are supported in the vehicle UE under the specific condition and control information is transmitted with a specific (or predetermined) TTI, an RX UE may attempt decoding for each TTI according to capability. On the other hand, if the control information is also transmitted to different TTIs, the TX UE may inform the RX UE of information of TTI transmitted by the TX UE or extra information related thereto through a predefined channel or a higher layer signal (e.g., RRC signal).

Figure 33:
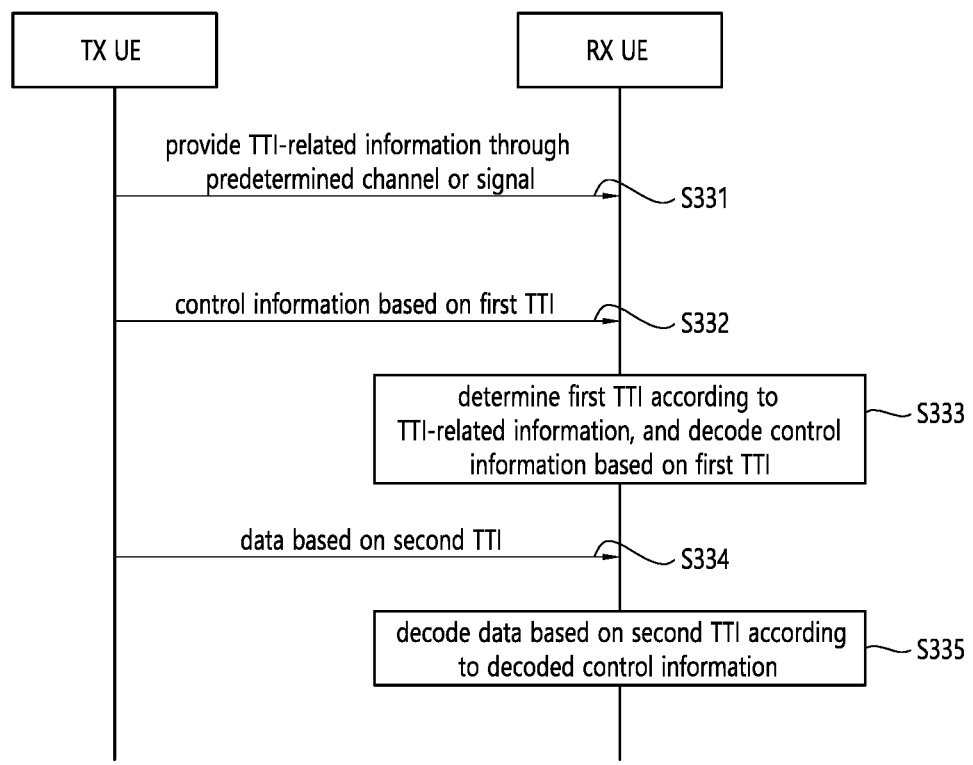
FIG. 33 shows an example of an operation between a TX UE and an RX UE.

FIG. 33 shows an example of an operation between a TX UE and an RX UE.

Referring to FIG. 33, the TX UE may provide TTI-related information to the RX UE through a predetermined channel or signal (S331). The TX UE transmits control information based on a first TTI (S332).

The RX UE may determine the first TTI according to the TTI-related information, and may decode the control information based on the first TTI (S333).

The TX UE transmits data based on a second TTI (S334).

The RX UE may decode the data based on the second TTI according to the decoded control information (S335).

Figure 34:
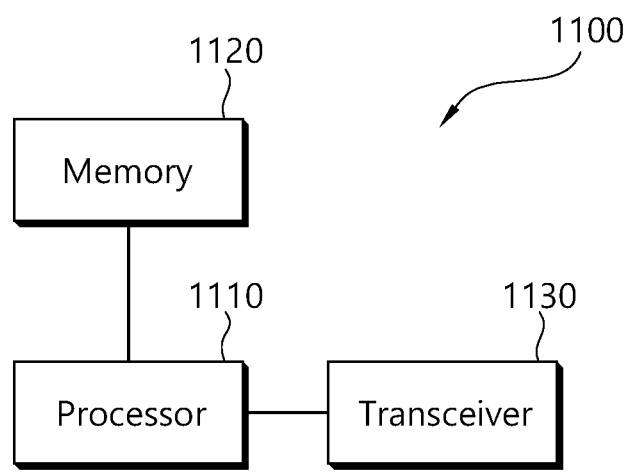
FIG. 34 is a block diagram showing a UE according to an embodiment of the present disclosure.

FIG. 34 is a block diagram showing a UE according to an embodiment of the present disclosure.

Referring to FIG. 34, a UE 1100 includes a processor 1110, a memory 1120, and a transceiver 1130.

According to an embodiment, the processor 1110 may perform functions/operations/methods described in the present disclosure. For example, the processor 1110 may select a transmission scheme in a first symbol and a last symbol among a plurality of symbols included in a transmission time interval, and may transmit the signal in the first symbol and the last symbol by using the selected transmission scheme. The selected transmission scheme may be a first transmission scheme or a second transmission scheme. The first transmission scheme may be a transmission scheme in which the signal is transmitted by using one symbol determined for a first subcarrier spacing in a time domain and subcarriers spaced apart with a specific interval in a frequency domain. The second transmission scheme may be a transmission scheme in which the signal is transmitted by using one symbol determined for a second subcarrier spacing in the time domain and subcarriers consecutive in the frequency domain.

The memory 1120 may store information/code/command/measurement result, and the like required for UE 1100 operation. The memory 1120 may be connected to the processor 1110.

The transceiver 1130 is connected to the processor 1110 and transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include one or more antenna for transmitting and/or receiving radio signals. When the above-described embodiment is implemented in software, the above-described method may be implemented using a module (process or function) which performs the above function. The module may be stored in the memory and executed by the processor. The memory may be disposed to the processor internally or externally and connected to the processor using a variety of well-known means.

Figure 35:
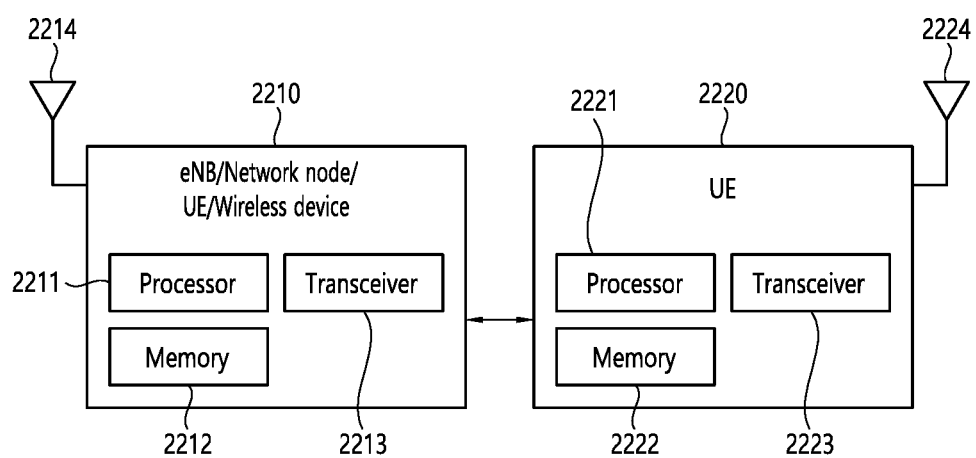
FIG. 35 is a block diagram for an example of a wireless communication device according to an embodiment of the present disclosure.

FIG. 35 is a block diagram for an example of a wireless communication device according to an embodiment of the present disclosure.

Referring to FIG. 35, a wireless communication device may include a base station 2210 and a UE 2220. The UE 2220 may be positioned in the area of the base station 2210. In some scenario, the wireless communication device may include multiple UEs. In the example of FIG. 35, the base station 2210 and the UE 2220 are shown, but the present disclosure is not limited thereto. For example, the base station 2210 may be replaced by another network node, UE, wireless device, or other device.

The base station and the UE may be represented as a wireless communication device or a wireless device, respectively. In FIG. 35, the base station may be replaced by a network node, a wireless device or a UE.

The base station 2210 may include one or more processors including a processor 2211, at least one memory including a memory 2212, and at least one transceiver including a transceiver 2213. The processor 2211 may perform the functions, procedures, and/or methods described above. The processor 2211 may perform one or more protocols. For example, the processor 2211 may perform one or more layers of the wireless interface protocol. The memory 2212 is connected to the processor 2211 and may store various types of information and/or instructions. The transceiver 2213 is connected to the processor 2211 and may be controlled to transmit and receive wireless signals.

The UE 2220 may include at least one processor including a processor 2221, at least one memory device including a memory 2222, and at least one transceiver including a transceiver 2223.

The processor 2221 may perform the functions, procedures, and/or methods described above. The processor 2221 may implement one or more protocols. For example, the processor 2221 may implement one or more layers of a wireless interface protocol. The memory 2222 is coupled to the processor 2221 and may store various types of information and/or instructions. The transceiver 2223 is connected to the processor 2221 and may be controlled to transmit and receive wireless signals.

The memory 2212 and/or the memory 2222 may be coupled internally or externally to the processor 2211 and/or the processor 2221 or may be connected to other processors through a variety of technologies such as wired or wireless connections.

The base station 2210 and/or the UE 2220 may have more than one antenna. For example, antenna 2214 and/or antenna 2224 may be configured to transmit and receive wireless signals.

Figure 36:
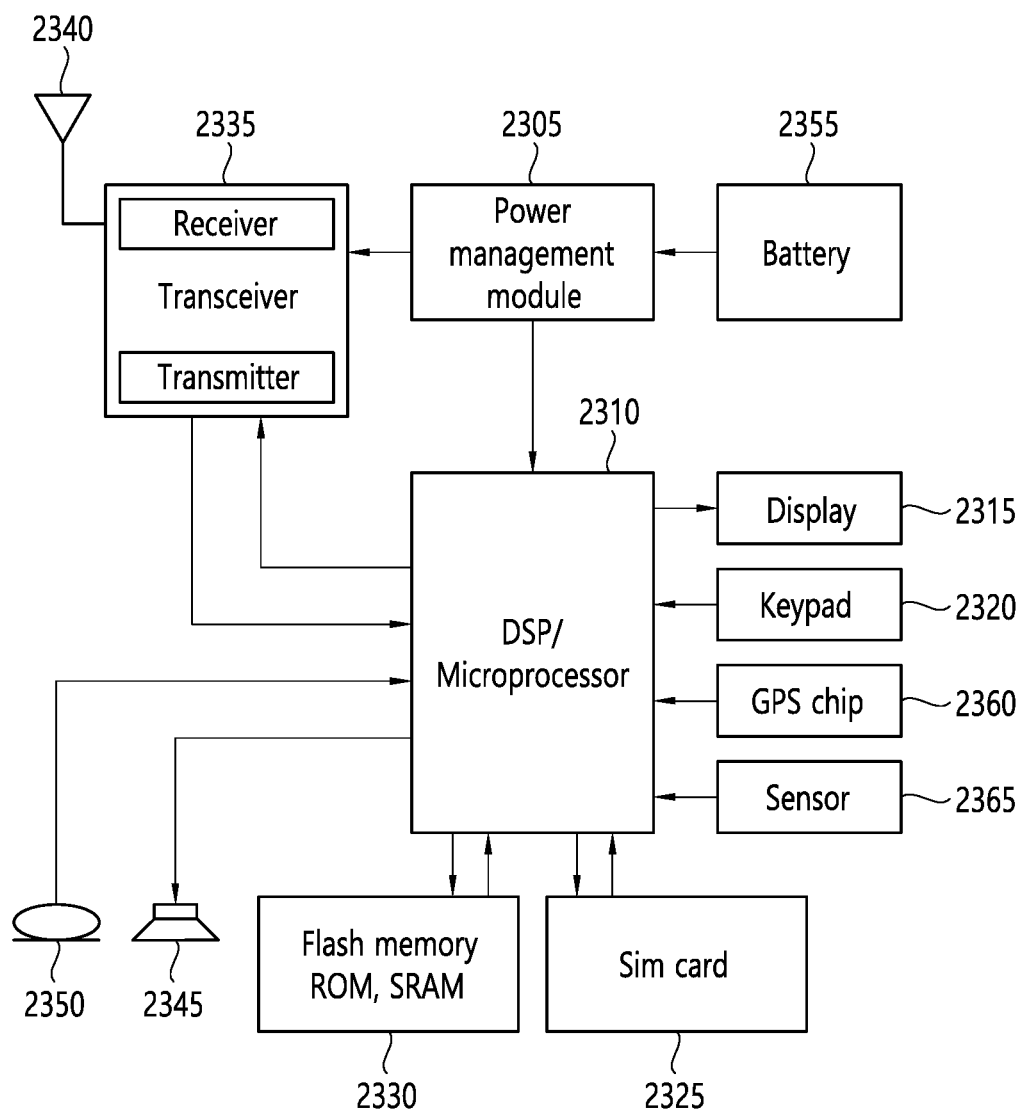
FIG. 36 illustrates an example of a wireless communication device according to an embodiment of the present disclosure.

FIG. 36 illustrates an example of a wireless communication device according to an embodiment of the present disclosure.

FIG. 36 may be a diagram more specifically illustrating the UE 2220 of FIG. 35 above. However, the wireless communication device in FIG. 36 is not limited to the UE 2220. The wireless communication device may be an arbitrary proper mobile computer device configured to perform one or more implementations of the present disclosure such as a vehicle communication system or device, a wearable device, a portable computer, a smart phone, and the like.

Referring to FIG. 36, the UE 2220, like the processor 2310, may include at least one processor (e.g., DSP or microprocessor), a transceiver 2335, a power management module 2305, an antenna 2340, a battery 2355, a display 2315, a keypad 2320, a GPS chip 2360 and sensor 2365, a memory 2330, a subscriber identification module (SIM) card 2325 (this component is optional), a speaker 2345, and a microphone 2350. The UE 2220 may also include a single antenna or multiple antennas.

The processor 2310 may be configured to perform a function, a process, and/or a method described above. According to an implementation example, the processor 2310 may perform one or more protocols like layers of a wireless interface protocol.

The memory 2330 is connected to the processor 2310 to store information related to an operation of the processor 2310. The memory 2330 may be positioned inside or outside the processor 2310 and connected with another processor through various techniques such as wired or wireless connection.

A user may input various types of information (e.g., command information like a telephone number) by pressing the keypad 2320 or by voice activation using the microphone 2350. The processor 2310 receives such command information and processes to perform appropriate functions including dialing a telephone number. As an example, data (e.g., operational data) may be searched from the SIM card 2325 or the memory 2330. As another example, the processor 2310 may receive and process GPS information from the GPS (Global Positioning System) chip 2360 to perform the function related to a position of UE such as vehicle navigation, map service, and the like. As another example, the processor 2310 may display various types of information and data on the display 2315 for the user to recognize and for convenience.

The transceiver 2335 is connected to the processor 2310 to transmit/receive an RF signal. The processor 2310 transfers the command information to the RF module 2335 to initiate communication, for example, to transmit wireless signals including voice communication data. The transceiver 2335 includes a receiver and a transmitter for receiving and transmitting the wireless signals. The antenna 2340 functions to transmit and receive the wireless signals. According to an implementational example, upon receiving the wireless signals, the transceiver 2335 may transfer the signals for processing by the processor 2310 and convert the signals to a baseband. The processed signal may be converted into to audible or readable information output via the speaker 2345 according to various techniques.

According to an implementational example, the sensor 2365 may be connected to the processor 2310. The sensor 2365 may include one or more detection device configured to discover a format of various types of information including a velocity, an acceleration, a light, a vibration, a proximity, a position, an image, but not limited thereto. The processor 2310 may receive and process the sensor information obtained from the sensor 2365 and perform various forms of function such as collision prevention, automatic driving, and the like.

In the example of FIG. 36, various constituent elements (e.g., a camera, a USB port, etc.) may be further included in the UE. For example, the camera may be connected to the processor 2310 and used for various services such as automatic driving, vehicle safety service, and the like.

As such, FIG. 36 is just an example, and the implementation is not limited thereto. For example, some constituent elements (e.g., the keypad 2320, the GPS chip 2360, the sensor 2365, the speaker 2345, and/or the microphone 2350) may not be implemented in a certain scenario.

Figure 37:
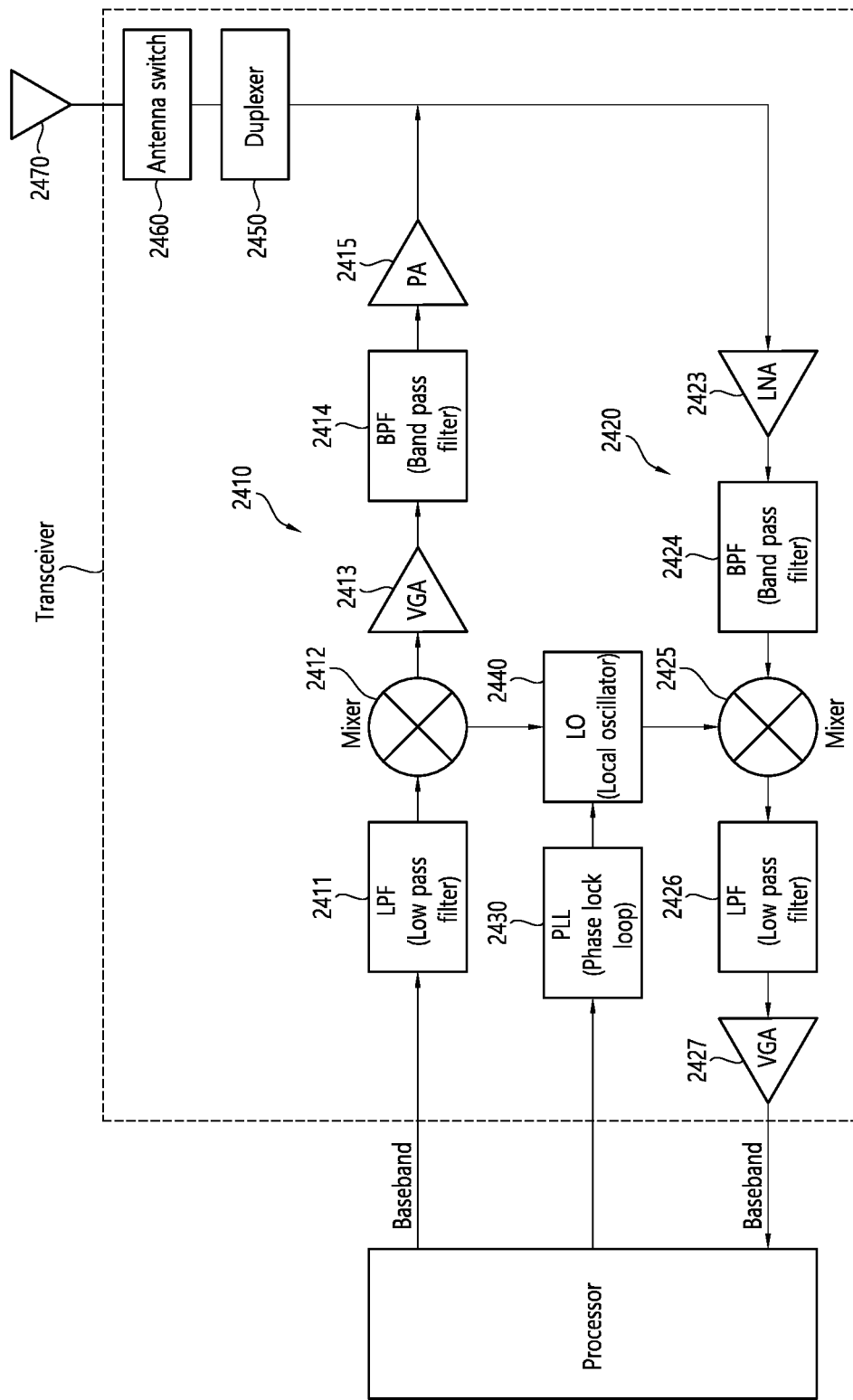
FIG. 37 illustrates an example of a transceiver of a wireless communication device according to an embodiment of the present disclosure.

FIG. 37 illustrates an example of a transceiver of a wireless communication device according to an embodiment of the present disclosure.

For example, FIG. 37 may show an example of a transceiver which may be implemented in frequency division duplex (FDD) system.

In a transmission path, like the processor depicted in FIG. 35 and FIG. 36, at least one processor may process such that data is transmitted and send a signal such as an analogue output signal to the transceiver 2410.

In the example, the analogue output signal in the transceiver 2410, for example, may be filtered by a low pass filter (LPF) 2411 to remove noise due to previous digital-analogue conversion (ADC), upconverted to RF from baseband by the upconverter (e.g., mixer) 2412 and amplified by an amplifier such as a variable gain amplifier 2413. The amplified signal is filtered by a filter 2414, amplified by a power amplifier (PA) 2415, routed through duplexer(s) 2450/antenna switch(es) 2460, and then transmitted through an antenna 2470.

In a reception path, the antenna 2470 receives a signal in wireless environment, and the received signals are routed in the antenna switch(es) 2460/duplexer(s) 2450 and sent to the receiver 2420.

In the above example, the signal received in the receiver 2420 is amplified by an amplifier such as a low noise amplifier (LNA) 2423, filtered by a band pass filter 2424, and down-converted to baseband from RF by a down-converter (e.g., mixer) 2425.

The down-converted signal is filtered by a low pass filter (LPF) 2426, amplified by an amplifier such as VGA 2427 to obtain an analog input signal, and the analog input signal is provided to one or more processors.

Furthermore, a local oscillator (LO) 2440 generates a transmission/reception of LO signal and send it to the upconverter 2412 and the down-converter 2425, respectively.

According to an implementational example, a phase lock loop 2430 may receive control information from the processor and send control signals to a LO generator 2440 to generate transmission/reception of LO signals in an appropriate frequency.

The implementations are not limited to the specific deployment shown in FIG. 37, but various constituent elements and circuits may be differently disposed from the example shown in FIG. 37.

Figure 38:
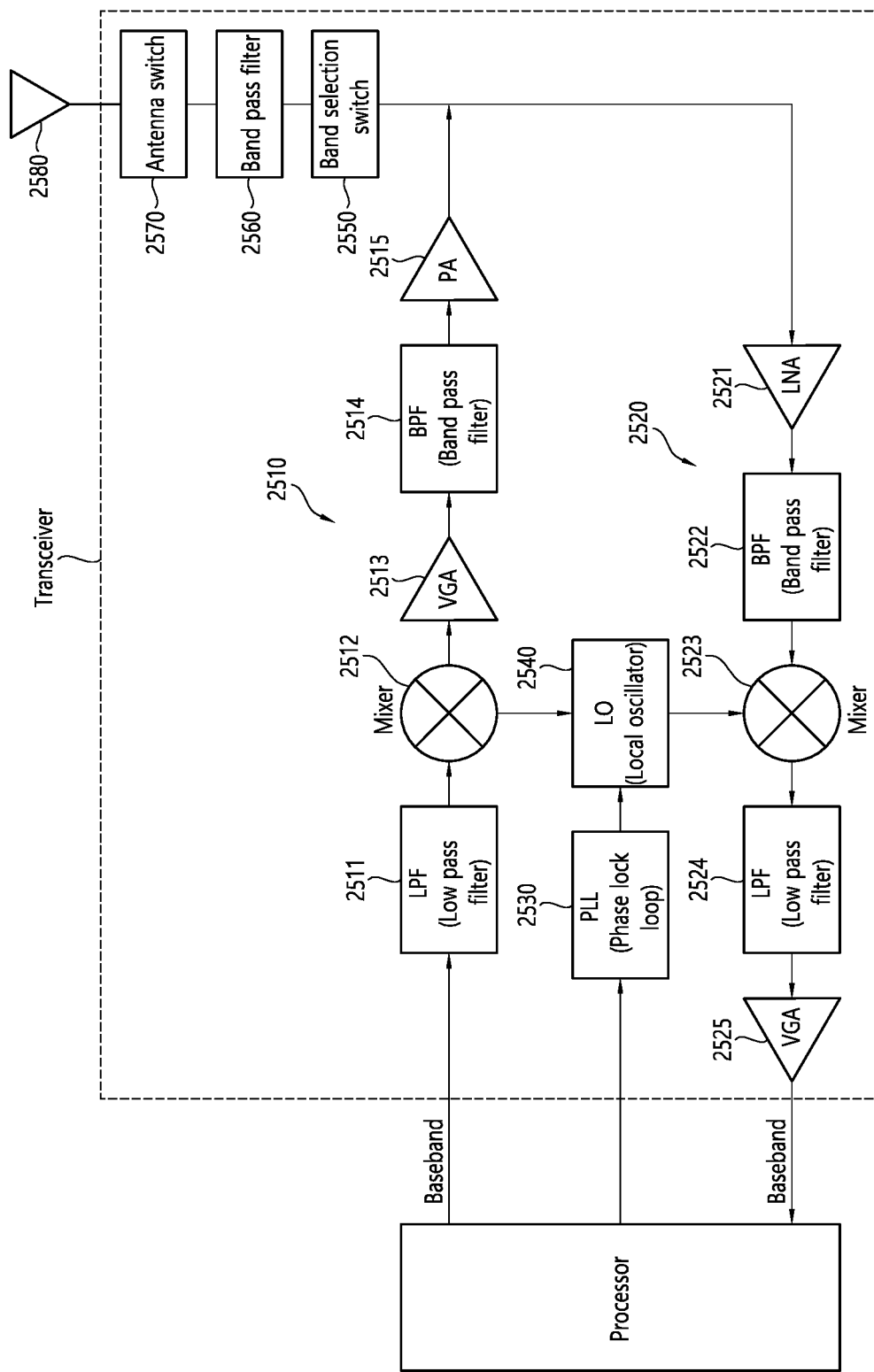
FIG. 38 illustrates another example of a transceiver of a wireless communication device according to an embodiment of the present disclosure.

FIG. 38 illustrates another example of a transceiver of a wireless communication device according to an embodiment of the present disclosure.

For example, FIG. 38 may show an example of a transceiver which may be implemented in time division duplex (TDD) system.

According to an implementational example, a transmitter 2510 and a receiver 2520 of a transceiver of the TDD system may have one or more similar properties to the transmitter and the receiver of the FDD system. Hereinafter, a structure of the transceiver of the TDD system is described.

In a transmission path, a signal amplified by a power amplifier (PA) 2515 of the transmitter is routed through a band selection switch 2550, a band pass filter (BPF) 2560 and an antenna switch(es) 2570 and transmitted to an antenna 2580.

In a reception path, the antenna 2580 receives a signal in wireless environment, and the received signals are routed through the antenna switch(es) 2570, the band pass filter (BPF) 2560 and the band selection switch 2550 and provided to the receiver 2520.

Figure 39:
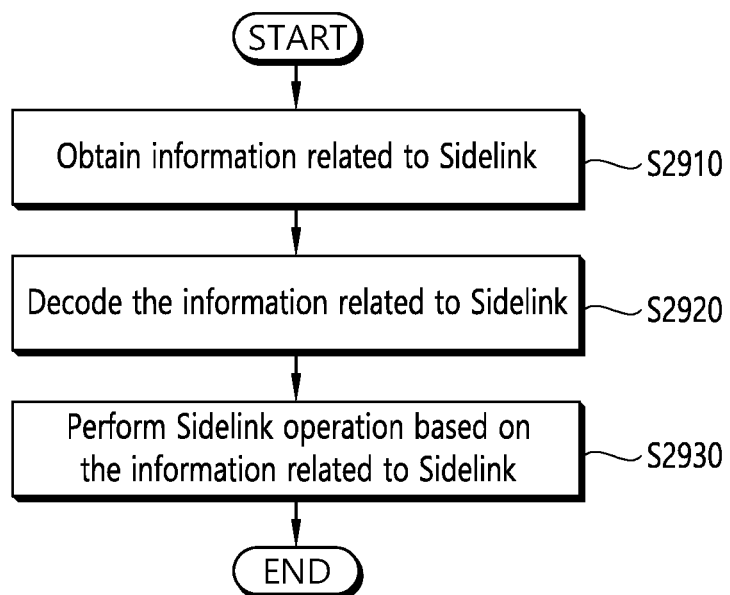
FIG. 39 illustrates a wireless device operation example related to Sidelink communication.

FIG. 39 illustrates a wireless device operation example related to Sidelink communication. The wireless device operation related to Sidelink described in FIG. 39 is just an example, but Sidelink operations using various techniques may be performed in the wireless device. Sidelink is UE-to-UE interface for Sidelink communication and/or Sidelink discovery. Sidelink may correspond to PC5 interface. In wide meaning, the Sidelink operation may be transmission/reception of information between UEs. Sidelink may deliver various types of information.

In the above example, a wireless device obtains information related to Sidelink (step, S2910). The information related to Sidelink may be one or more resource configurations. The information related to Sidelink may be obtained from another wireless device or a network node.

After obtaining the information, the wireless device decodes the information related to Sidelink (step, S2920).

After decoding the information related to Sidelink, the wireless device performs one or more Sidelink operations based on the information related to Sidelink (step, S2930). Here, the Sidelink operation(s) performed by the wireless device may be one or more operations described herein.

Figure 40:
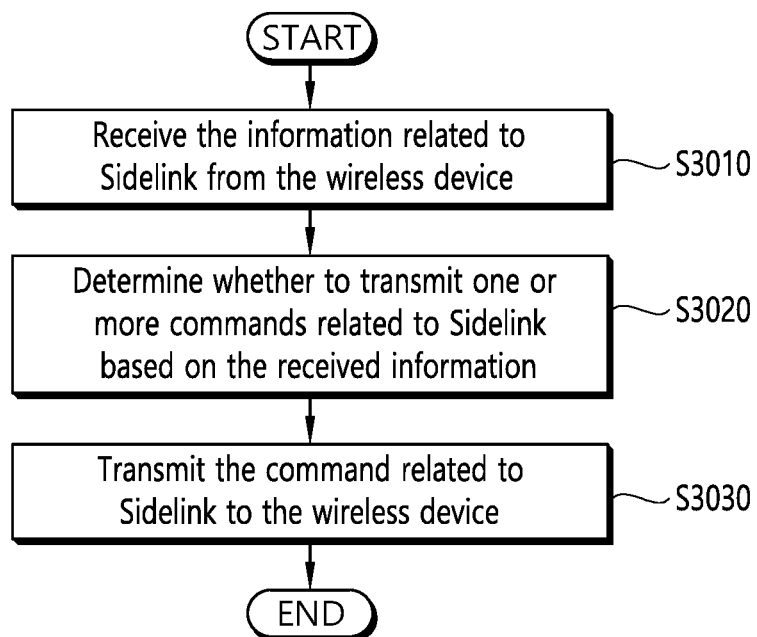
FIG. 40 illustrates a network node operation example related to Sidelink communication.

FIG. 40 illustrates a network node operation example related to Sidelink communication. The network node operation related to Sidelink described in FIG. 40 is just an example, but Sidelink operations using various techniques may be performed in the network node.

The network node receives the information related to Sidelink from the wireless device (step, S3010). For example, the information related to Sidelink may be 'SidelinkUEInformation' used for informing Sidelink information to the network node.

After receiving the information, the network node determines whether to transmit one or more commands related to Sidelink based on the received information (step, S3020).

According to the determination of the network node to transmit the command, the network node transmits the command(s) related to Sidelink to the wireless device (step, S3030). According to an implementational example, after receiving the command transmitted by the network node, the wireless device may perform one or more Sidelink operation(s) based on the received command.

Figure 41:
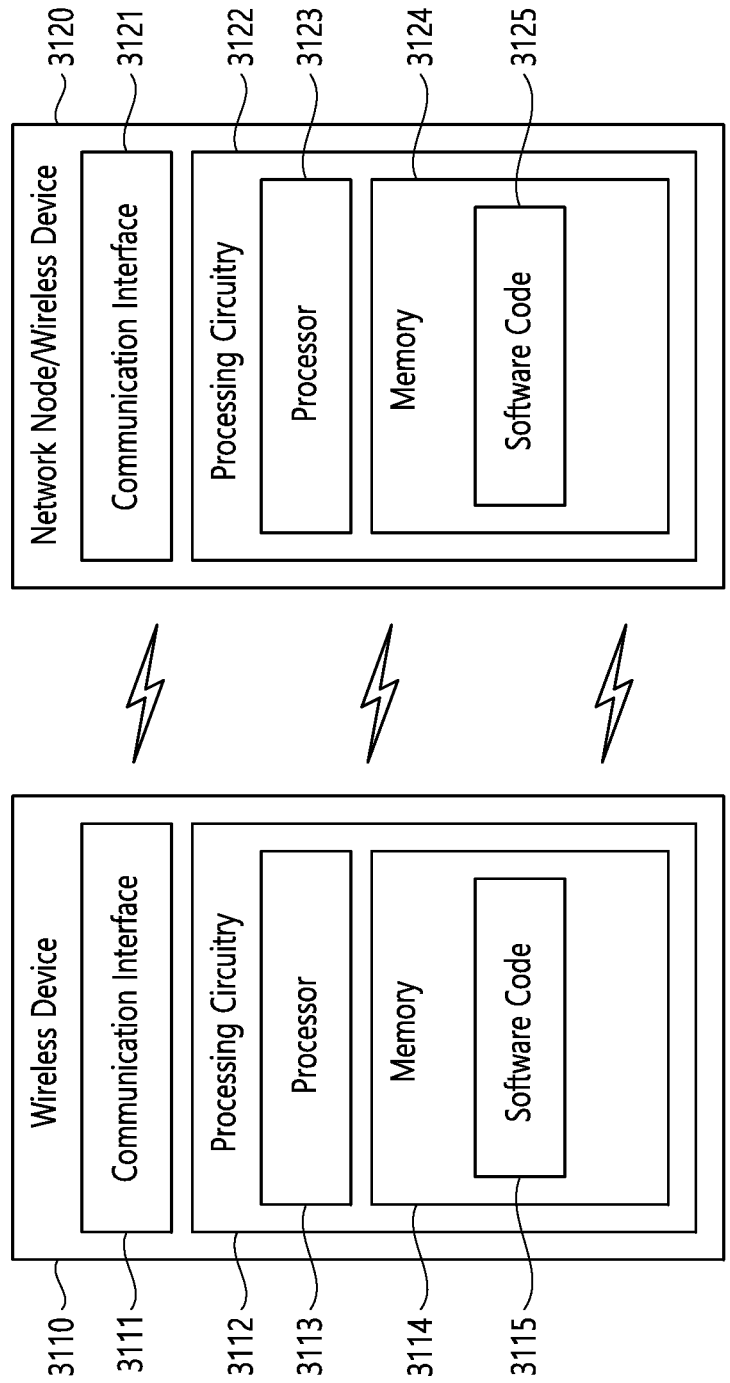
FIG. 41 is a block diagram illustrating an example of implementing a wireless device 3110 and a network node 3120.

FIG. 41 is a block diagram illustrating an example of implementing a wireless device 3110 and a network node 3120. The network node 3120 may be replaced by a wireless device or a UE.

In the example, the wireless device 3110 includes a communication interface 3111 to communicate with one or more other wireless devices, network nodes and/or other elements in the network. The communication interface 3111 may include one or more transmitter, one or more receiver and/or one or more communication interface. The wireless device 3110 includes a processing circuit 3112. The processing circuit 3112 may include one or more processors including a processor 3113 and one or memory including a memory 3114.

The processing circuit 3112 may be configured to control arbitrary methods described in the present disclosure and/or processes and/or for the wireless device 3110 to perform such a method and/or process. The processor 3113 corresponds to one or more processor for performing the wireless device functions described in the present disclosure. The wireless device 3110 includes the memory 3114 configured to store data, program software code and/or other information described in the present disclosure.

According to an implementational example, when one or more processors is executed like the processor 3113, the memory 3114 is configured to store software code 3115 including a command to perform a part or the whole process according to the present disclosure described above.

For example, like the processor 3113, one or more processors that control one or more transceivers like the transceiver 2233 may perform one or more process related to transmission/reception of information to transmit/receive information.

The network node 3120 includes a communication interface 3121 to communicate with one or more other network nodes, wireless devices and/or other elements in a network. Here, the communication interface 3121 includes one or more transmitters, one or more receives and/or one or more communication interfaces. The network node 3120 includes a processing circuit 3122. Here, the processing circuit may include a processor 3123 and a memory 3124.

According to an implementational example, when one or more processors is executed like the processor 3123, the memory 3124 is configured to store software code 3125 including a command to perform a part or the whole process according to the present disclosure.

For example, like the processor 3123, one or more processors that control one or more transceivers like the transceiver 2213 may perform one or more process related to transmission/reception of information to transmit/receive information.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that various modifications and alterations of the present disclosure may be embodied without departing from the concept or the scope of the present disclosure.

The present disclosure has been described with referring to an example applied to the 3GPP LTE/LTE-A system or 5G system (NR system), but the present disclosure may also be applied to other various wireless communication systems.

What is claimed is:

1. A signal transmission method of a terminal in a wireless communication system, the method comprising:
    selecting a transmission scheme in a first symbol and a last symbol among a plurality of symbols comprised in a transmission time interval (TTI); and
    transmitting the signal in the first symbol and the last symbol by using the selected transmission scheme,
    wherein the selected transmission scheme is a first transmission scheme or a second transmission scheme,
    wherein the first transmission scheme is a transmission scheme in which the signal is transmitted by using one symbol determined for a first subcarrier spacing in a time domain and subcarriers spaced apart with a specific interval in a frequency domain, and
    wherein the second transmission scheme is a transmission scheme in which the signal is transmitted by using one symbol determined for a second subcarrier spacing in the time domain and subcarriers consecutive in the frequency domain.

2. The method of claim 1, wherein a length in a time domain of the first symbol and last symbol is a time length determined for a case where a subcarrier spacing is 15 kHz.

3. The method of claim 1, wherein the second subcarrier spacing is n times (where n is a natural number greater than or equal to 2) the first subcarrier spacing.

4. The method of claim 3, wherein a length in a time domain of one symbol determined for the second subcarrier spacing is 1/n times a length in a time domain of one symbol determined for the first subcarrier spacing.

5. The method of claim 1, wherein the first transmission scheme is a transmission scheme in which the signal is transmitted by using even-numbered subcarriers or odd-numbered subcarriers in the frequency domain.

6. The method of claim 1, wherein the signal is data or a demodulation reference signal (DM RS).

7. The method of claim 1, wherein the first subcarrier spacing is 15 kHz.

8. The method of claim 1, wherein the terminal transmits a DM RS for vehicle-to-everything (V2X) communication by using specific resources, wherein the specific resources comprise a resource in the first symbol.

9. A terminal comprising:
a transceiver transmitting and receiving a radio signal; and
a processor operatively coupled with the transceiver, wherein the processor is configured to:
select a transmission scheme in a first symbol and a last symbol among a plurality of symbols comprised in a transmission time interval (TTI); and
transmit the signal in the first symbol and the last symbol by using the selected transmission scheme,
wherein the selected transmission scheme is a first transmission scheme or a second transmission scheme,
wherein the first transmission scheme is a transmission scheme in which the signal is transmitted by using one symbol determined for a first subcarrier spacing in a time domain and subcarriers spaced apart with a specific interval in a frequency domain, and
wherein the second transmission scheme is a transmission scheme in which the signal is transmitted by using one symbol determined for a second subcarrier spacing in the time domain and subcarriers consecutive in the frequency domain.

10. The terminal of claim 9, wherein a length in a time domain of the first symbol and last symbol is a time length determined for a case where a subcarrier spacing is 15 kHz.

11. The terminal of claim 9, wherein the second subcarrier spacing is n times (where n is a natural number greater than or equal to 2) the first subcarrier spacing.

12. The terminal of claim 11, wherein a length in a time domain of one symbol determined for the second subcarrier spacing is 1/n times a length in a time domain of one symbol determined for the first subcarrier spacing.

13. The terminal of claim 9, wherein the first transmission scheme is a transmission scheme in which the signal is transmitted by using even-numbered subcarriers or odd-numbered subcarriers in the frequency domain.

14. The terminal of claim 9, wherein the signal is data or a demodulation reference signal (DM RS).

15. The terminal of claim 9, wherein the processor transmits a DM RS for vehicle-to-everything (V2X) communication by using specific resources, wherein the specific resources comprise a resource in the first symbol.

* * * * *